US008416580B2

(12) United States Patent
Matsumoto et al.

(10) Patent No.: US 8,416,580 B2
(45) Date of Patent: Apr. 9, 2013

(54) ELECTRONIC APPARATUS

(75) Inventors: Yasuo Matsumoto, Tokyo (JP); Naoki Tani, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 15 days.

(21) Appl. No.: 13/271,929

(22) Filed: Oct. 12, 2011

(65) Prior Publication Data
US 2012/0236515 A1  Sep. 20, 2012

(51) Int. Cl.
H05K 7/02 (2006.01)
H05K 7/04 (2006.01)
(52) U.S. Cl. .................. 361/807; 361/728; 361/752
(58) Field of Classification Search .......... 361/728–730, 361/752, 796, 800, 755, 715, 807, 809, 810; 455/575.1–575.4, 575.7; 174/138 E, 138 G
See application file for complete search history.

(56) References Cited

U.S. PATENT DOCUMENTS

| | | | |
|---|---|---|---|
| 5,715,139 A * | 2/1998 | Nakajima | 361/679.55 |
| 6,091,601 A * | 7/2000 | Schlesener et al. | 361/679.28 |
| 8,164,910 B2 * | 4/2012 | Hiratomo | 361/730 |
| 8,238,088 B2 * | 8/2012 | Itakura | 361/679.27 |
| 8,310,844 B2 * | 11/2012 | Hashimoto et al. | 361/826 |
| 2003/0016489 A1 | 1/2003 | Agata et al. | |
| 2009/0040699 A1 | 2/2009 | Tanaka | |

FOREIGN PATENT DOCUMENTS

| | | |
|---|---|---|
| JP | 2003-029241 | 1/2003 |
| JP | 2003-087378 | 3/2003 |
| JP | 2005-217297 | 8/2005 |
| JP | 2009-043095 | 2/2009 |

OTHER PUBLICATIONS

Japanese Patent Application No. 2011-058591, Notice of Rejection, mailed Feb. 14, 2012, (with English Translation).

* cited by examiner

*Primary Examiner* — Hung S Bui
(74) *Attorney, Agent, or Firm* — Blakely, Sokoloff, Taylor & Zafman LLP

(57) ABSTRACT

According to one embodiment, an electronic apparatus includes a first housing comprising a first wall and a second wall located on an opposite side of the first wall; a second housing; a hinge configured to connect the first housing to the second housing so that the first housing and the second housing can be pivoted relative to each other; a component housed in a component housing portion formed at the first wall; and a fixing member comprising a housing fixing portion fixed to the first housing, a hinge fixing portion to which the hinge is fixed, and a supporting portion configured to support the component at a location close to the first wall, the supporting portion being located between the first wall and the second wall.

7 Claims, 21 Drawing Sheets

ELECTRONIC APPARATUS

CROSS-REFERENCE TO RELATED APPLICATIONS

This application is based upon and claims the benefit of priority from Japanese Patent Application No. 2011-058591, filed Mar. 16, 2011, the entire contents of which are incorporated herein by reference.

FIELD

Embodiments described herein relate generally to an electronic apparatus.

BACKGROUND

There have been known electronic apparatuses in which speakers are fixed to a hinge unit in a housing.

An electronic apparatus of this type is expected to have a structure that causes fewer problems when components that are at least partially housed in the housing are attached to the housing.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, an electronic apparatus comprises a first housing, a second housing, a hinge, a component, and a fixing member. The first housing comprises a first wall and a second wall located on an opposite side of the first wall. The hinge is configured to connect the first housing to the second housing so that the first housing and the second housing can be pivoted relative to each other. The component is housed in a component housing portion formed at the first wall. The fixing member comprises a housing fixing portion fixed to the first housing, a hinge fixing portion to which the hinge is fixed, and a supporting portion configured to support the component at a location close to the first wall. The supporting portion is located between the first wall and the second wall.

According to another embodiment, an electronic apparatus comprises a housing, a first component, a second component, and a fixing member. The housing comprises a first wall and a second wall located on an opposite side of the first wall. At least a part of the first component is contained in the housing. The second component is held in a component holder formed in the housing. The fixing member comprises a housing fixing portion fixed to the housing, a component fixing portion to which the first component is fixed, and a supporting portion configured to support the second component at a location close to the first wall. The supporting portion is located between the first wall and the second wall.

The following is a detailed description of embodiments. In the respective drawings illustrating the following embodiments, orientations are defined for convenience. An X-direction is a width direction of a housing 2a having a structure according to the embodiments, a Y-direction is a height direction (a depth direction), and a Z-direction is a thickness direction. The X-direction, the Y-direction, and the Z-direction are perpendicular to one another.

Figure 1:
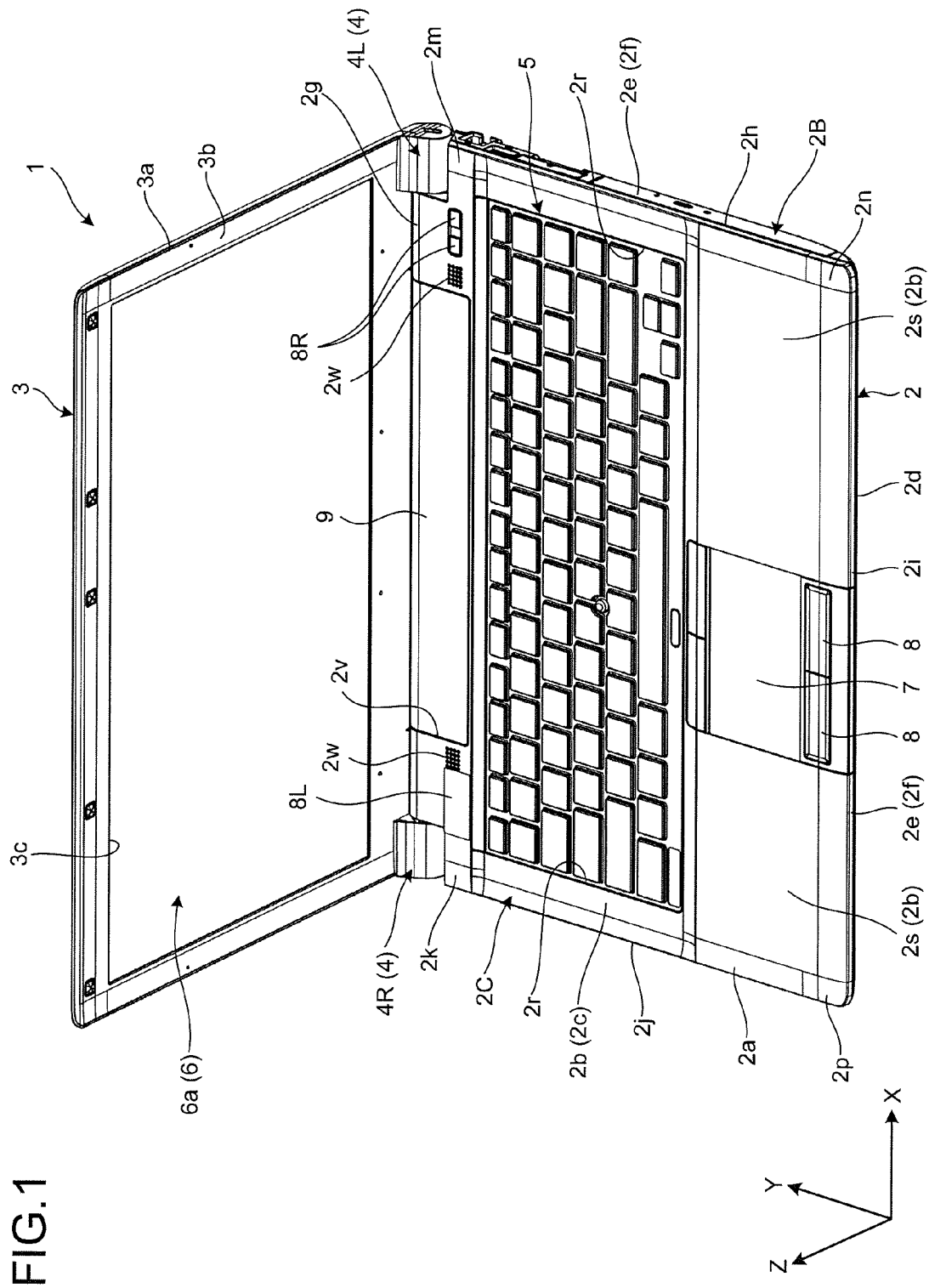
FIG. 1 is an exemplary perspective view of an electronic apparatus in an opened state according to an embodiment.

FIG. 1 is a perspective view of an example of an electronic apparatus according to this embodiment in an opened state. As illustrated in FIG. 1, an electronic apparatus 1 is formed as a so-called notebook-size personal computer. The electronic apparatus 1 comprises a rectangular, flat first unit 2, and a rectangular, flat second unit 3. The first unit 2 and the second unit 3 are connected by hinge mechanisms 4L and 4R (4) on both left and right sides in such a manner that the first unit 2 and the second unit 3 can rotatively move with respect to each other. Accordingly, the two units 2, 3 are switched between the opened state illustrated in FIG. 1 and a folded state not illustrated in FIG. 1.

A keyboard 5, a pointing device 7, click buttons 8, and the like serving as input operation modules (modules, input devices, operation modules, or input modules) are provided in the first unit 2 in such a manner that those components are exposed through an upper surface (a top surface, a surface) 2b serving as an external surface (a surface) of the housing 2a. A display panel 6 (such as a liquid crystal display (LCD) or an organic electro-luminescent display (OELD)) serving as a display module (a module, a display device, or an output module) is provided in the second unit 3 in such a manner that a display screen 6a is exposed through an opening 3c on the side of a front surface (a surface) 3b serving as an external surface (a surface) of a housing 3a. In the opened state, the keyboard 5, the display panel 6, and the like are exposed, and can be used by a user. In the folded state, on the other hand, the upper surface 2b and the front surface 3b surface each other and are located very close to each other, and the keyboard 5, the display panel 6, the pointing device 7, the click buttons 8, and the like are hidden inside the housings 2a and 3a. The housing 2a is an example of a first housing, and the housing 3a is an example of a second housing.

The housing 2a of the first unit 2 comprises a rectangular plate-like upper wall 2c forming the upper surface 2b, a rectangular plate-like lower wall 2d forming a lower surface (a bottom surface or a surface, not illustrated), and sidewalls (surrounding walls, vertical walls, or standing walls) 2f forming side surfaces (surrounding surfaces or surfaces) 2e. The lower wall 2d is located on the opposite side of the upper wall 2c, and is at a distance from the upper wall 2c. The sidewalls 2f extend in a direction (a vertical direction) perpendicular to the upper wall 2c and the lower wall 2d, and are provided to bridge the upper wall 2c and the lower wall 2d. The upper wall 2c, the lower wall 2d, and the sidewalls 2f are an example of walls. Also, the upper wall 2c is an example of a first wall, and the lower wall 2d is an example of a second wall.

The housing 2a comprises an upper portion (an upper housing, a component, or a cover) 2C and a lower portion (a lower housing, a component, or a bottom) 2B. The housing 2a is formed by integrating the upper portion 2C and the lower portion 2B. The upper portion 2C comprises the upper wall 2c, and may comprise part of the sidewalls 2f. Also, the lower portion 2B comprises the lower wall 2d, and may comprise part of the sidewalls 2f.

The housing 2a also comprises four end portions (side portions) 2g through 2j, and four corner portions 2k, 2m, 2n, and 2p. The end portion 2g is an example of a back end portion. The end portion 2i is an example of a front end portion located on the opposite side of the back end portion. The end portion 2h is an example of a right end portion (a side end portion). The end portion 2j is an example of a left end portion (a side end portion) located on the opposite side of the right end portion. A rectangular concavity 2r that is long in the width direction (the X-direction) is formed on the upper surface 2b. The keyboard 5 is housed (placed) in the concavity 2r. The concavity 2r is an example of a housing or a placement portion for the keyboard 5.

Palm rests 2s are formed in areas located on the front side of the concavity 2r of the upper wall 2c. The palm rests 2s form the relatively flat upper surface 2b. Since the concavity 2r is concave, the upper surface of the keyboard 5 housed (placed) in the concavity 2r can be set almost the same height as the upper surface 2b of each of the palm rests 2s.

The housing 2a also has a rectangular concavity 2v extending along the end portion 2g on the rear side. A battery (a module or the component) 9 is housed in the concavity 2v. That is, the concavity 2v is an example of a battery housing portion (a module housing portion, a battery mounting portion, a housing portion, or a mounting portion).

Through holes 2w are also formed on the rear side of the upper wall 2c and on both sides of the battery 9 in the width direction. Speaker modules 80L and 80R (see FIGS. 6 and 7 and others) are provided on the back sides of the through holes 2w (inside the housing). Sound that is emitted from the speaker modules 80L and 80R is released out of the housing 2a through the corresponding through holes 2w. In this embodiment, operation buttons (push buttons, operation parts, or input parts) 8L and 8R are provided near the through holes 2w. When an operator presses the operation button 8L or 8R, a switch (not illustrated) provided on one of circuit boards (printed boards, printed wiring boards, boards, or control boards) 10 and 60 (see FIGS. 6 and 7 and others) placed on the back sides of the operation buttons 8L and 8R is pressed, and an electrical signal is generated in accordance with the action (the state, contact state, distance, posture, or location) of the switch. The circuit board 60 is an example of a first circuit board, and the circuit board 10 is an example of a second circuit board.

Figure 2:
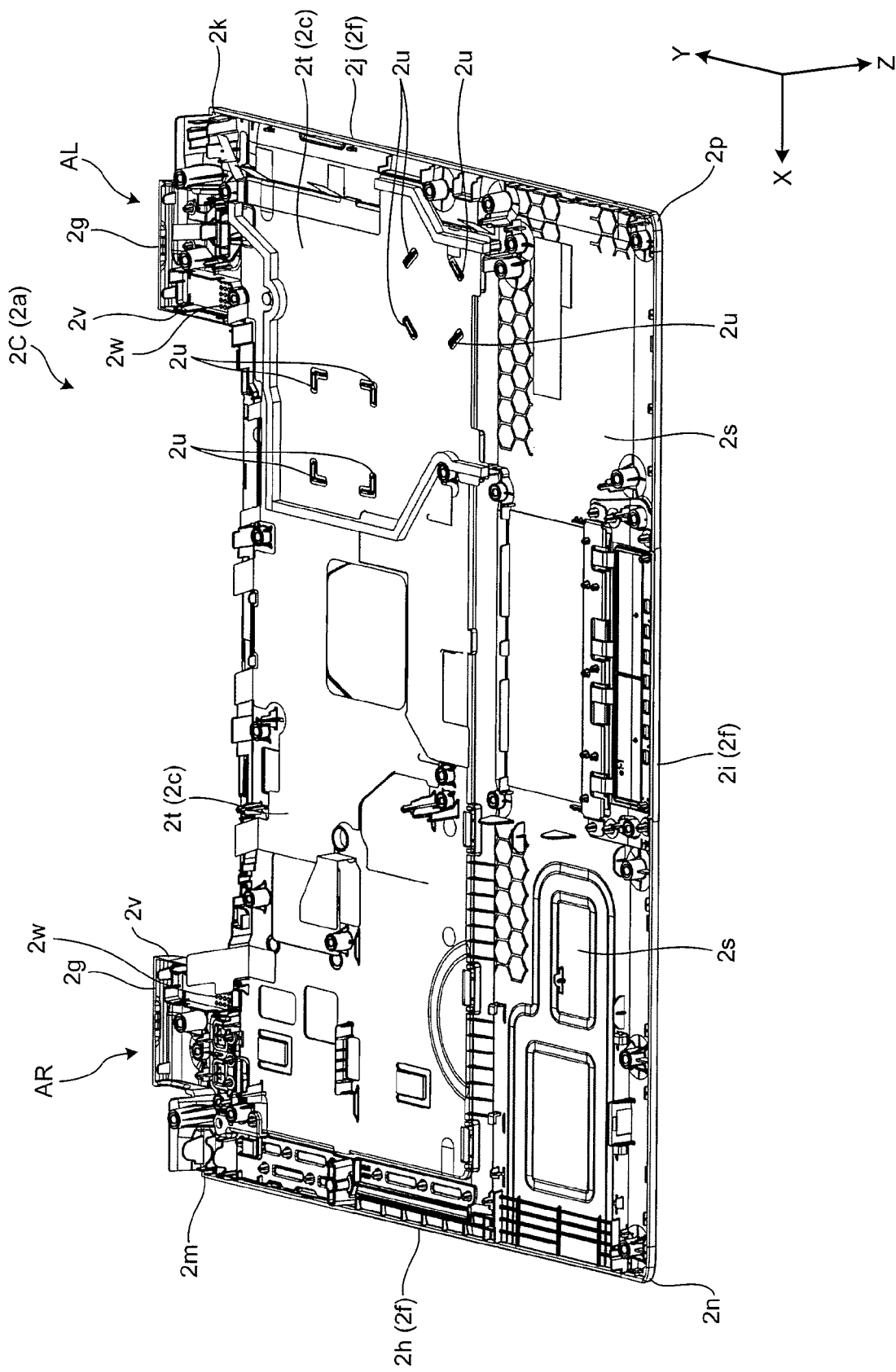
FIG. 2 is an exemplary perspective view illustrating the inside of a housing of the electronic apparatus in the embodiment.

FIG. 2 is a perspective view of an example of the upper portion 2C of the housing 2a viewed from the inside (a back side or a back surface 2t) of the housing 2a. As illustrated in FIG. 2, protrusions 2u are formed on the back surface 2t of the upper wall 2c. Areas (spaces or chambers) AL and AR that have substantially the same widths and are located inside the housing at portions protruding toward the rear side in the depth direction (the Y-direction) are provided on both sides of the width direction of the concavity 2v housing the battery 9 and are inside the housing. The areas AL and AR house components (modules) such as the circuit board 60, part of the circuit board 10, fixing members 30L and 30R (see FIGS. 3, 10, and 11, and others), the hinge mechanisms 4L and 4R (see FIGS. 12 and 13, and others). The fixing members 30L and 30R are an example of a first component.

Figure 3:
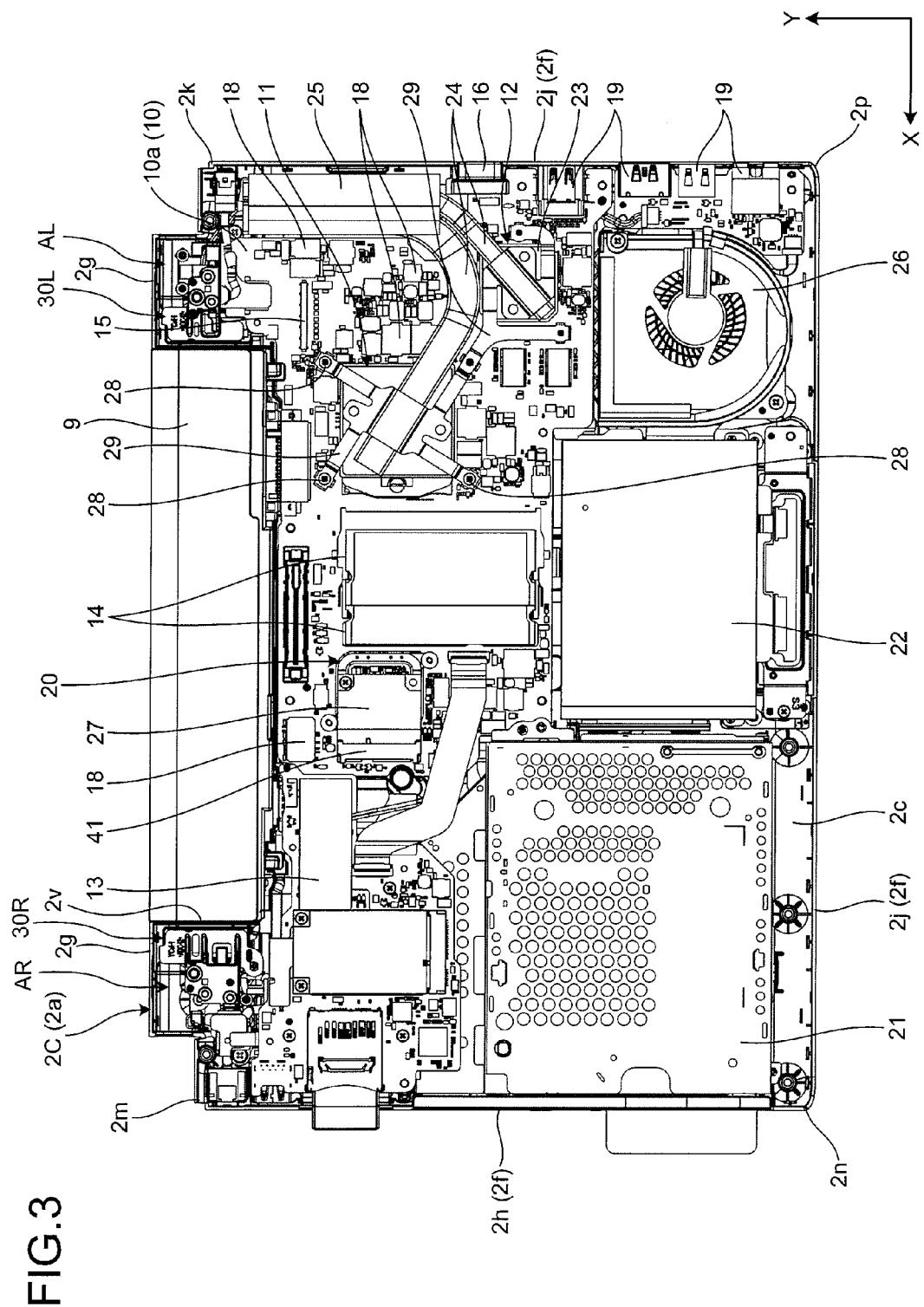
FIG. 3 is an exemplary plan view illustrating the inside of the housing, with a lower portion of a first unit being removed from the electronic apparatus in the embodiment.

FIG. 3 is a plan view of the inside of the housing 2a, with the lower portion 2B of the first unit 2 being removed. The housing 2a of the first unit 2 houses the circuit board (a board, a printed wiring board, or a control board) 10, an optical disk device (ODD) 21, a storage device 22, a heat sink 23, heat pipes 24, a radiator plate 25, a cooling fan 26, and the like. The circuit board 10 is a main board, for example. In this embodiment, one end (not illustrated) of each of the hinge mechanisms 4 is attached to the upper portion 2C onto which the above-described components (such as the circuit board 10, the ODD 21, the storage device 22, the heat sink 23, the heat pipes 24, the radiator plate 25, and the cooling fan 26) are attached. At this point, the other end (not illustrated) of each of the hinge mechanisms 4 is already attached to the assembled second unit 3. After that, the lower portion 2B is attached to the upper portion 2C.

A central processing unit (CPU) 11, a graphic controller 12, a power circuit component 13, a memory slot connector 14, a LCD connector 15, an input/output (I/O) connector 16, a power coil, devices 18, connectors 19, and the like are mounted on a surface 10a of the circuit board 10. It should be noted that the connectors 19 may be not mounted on the circuit board 10 in some cases, or are not mounted on another circuit board in other cases.

Figure 4:
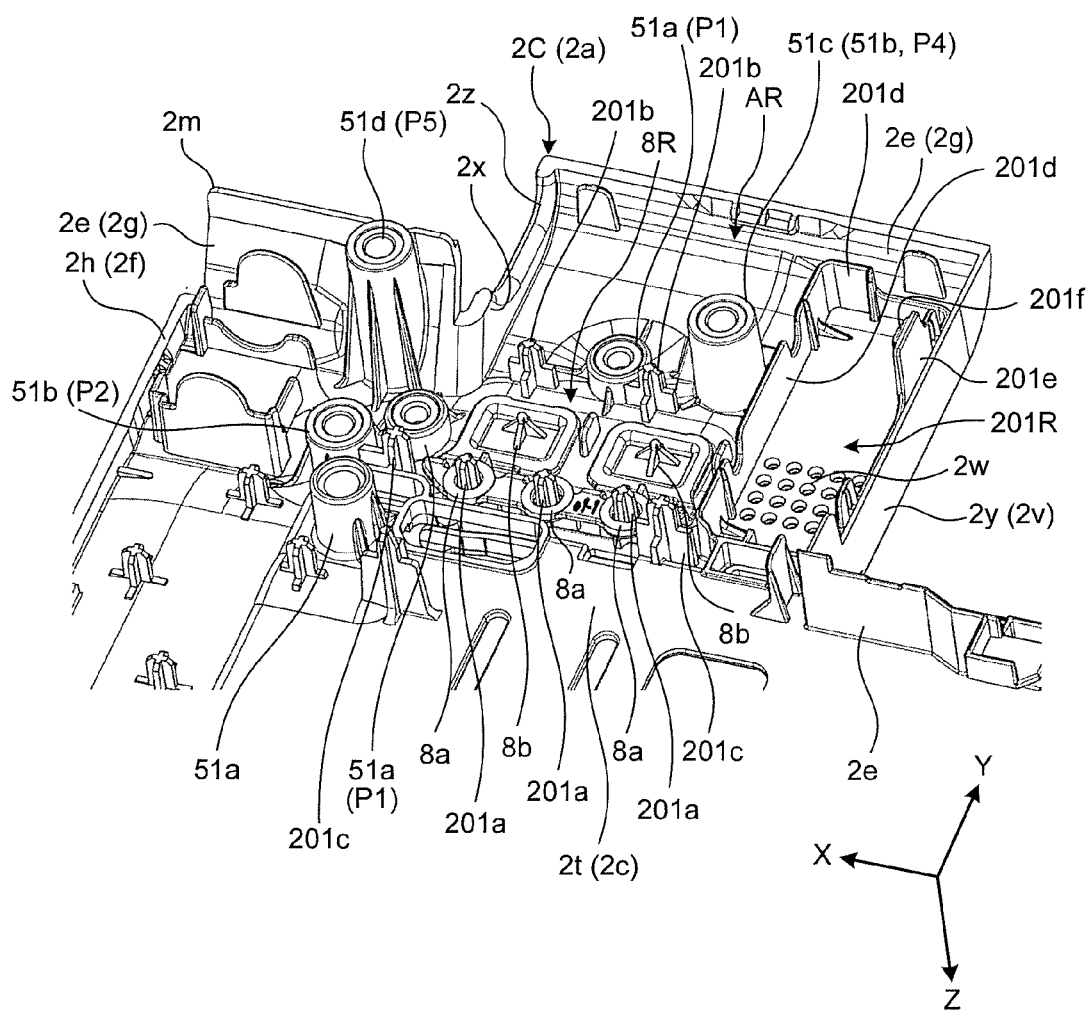
FIG. 4 is an exemplary perspective view illustrating a right rear side in the housing of an upper portion of the first unit of the electronic apparatus in the embodiment.
Figure 5:
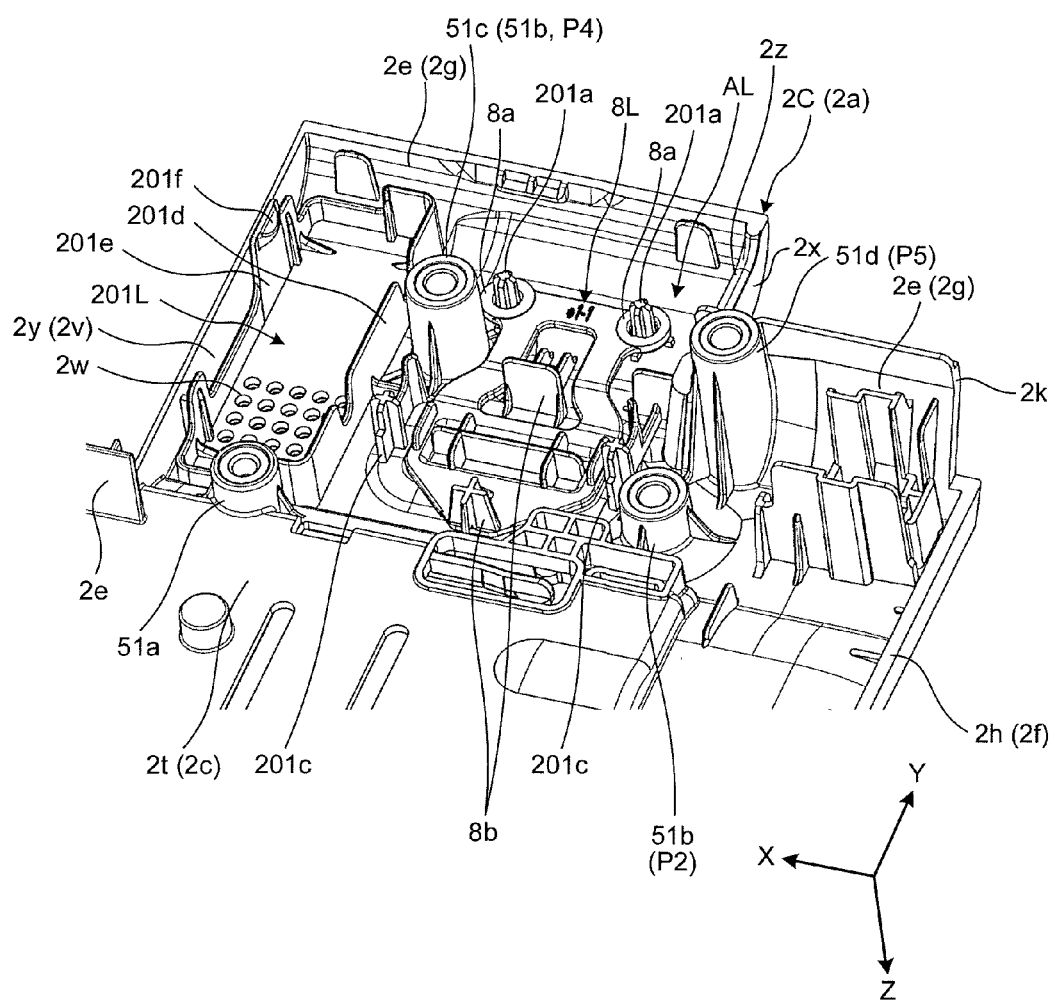
FIG. 5 is an exemplary perspective view illustrating a left rear side in the housing of the upper portion of the first unit of the electronic apparatus in the embodiment.
Figure 6:
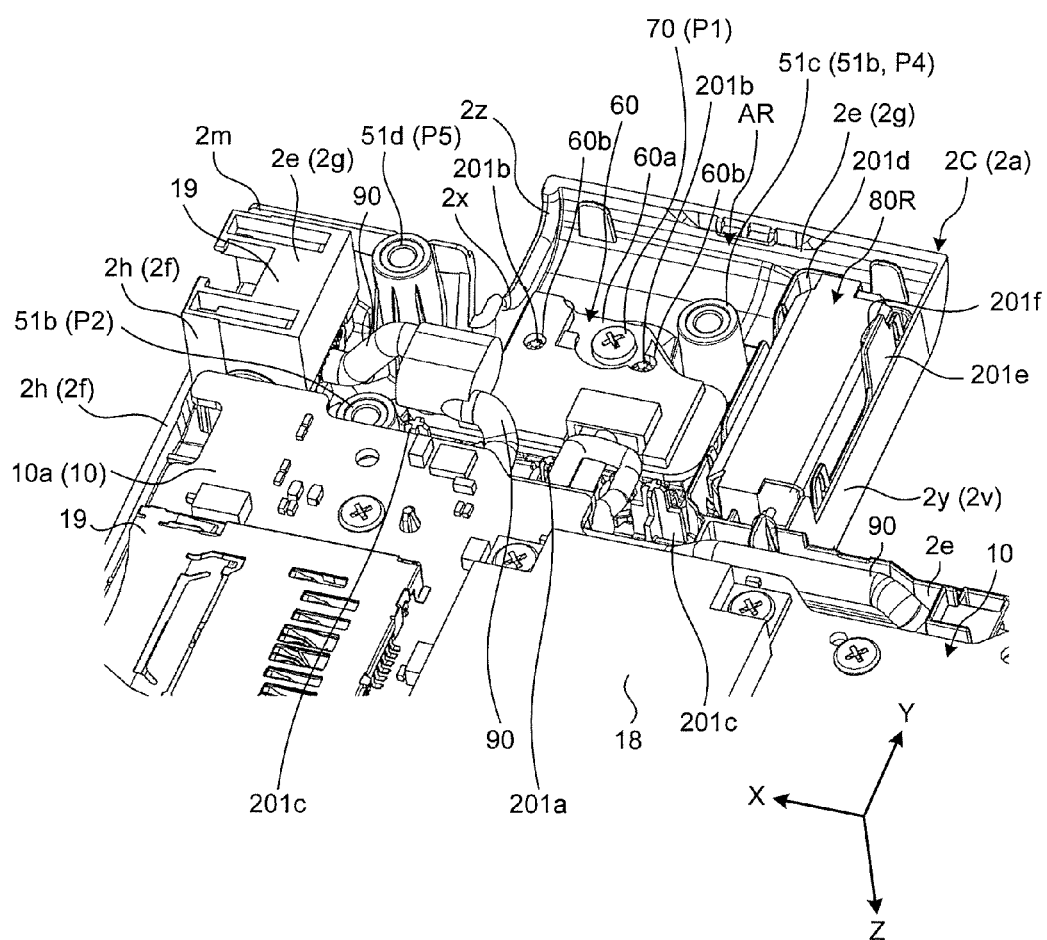
FIG. 6 is an exemplary perspective view illustrating a situation where a circuit board is attached to an area on the right rear side in the housing of the upper portion of the first unit of the electronic apparatus in the embodiment.
Figure 7:
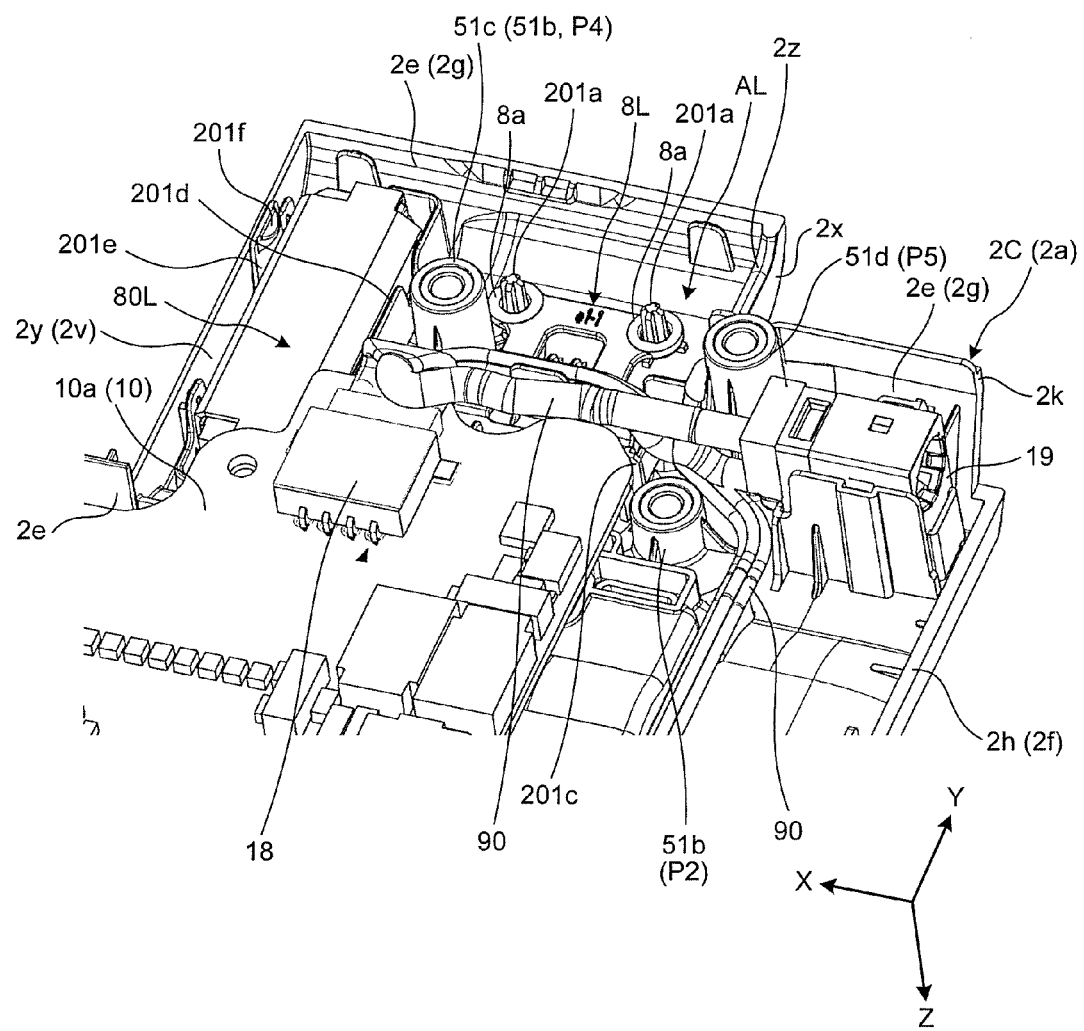
FIG. 7 is an exemplary perspective view illustrating a situation where a circuit board is attached to an area on the left rear side in the housing of the upper portion of the first unit of the electronic apparatus in the embodiment.

FIG. 4 is a perspective view illustrating an example of the area AR on the right rear side in the housing inside of the upper portion 2C of the housing 2a (or on the right rear side when viewed in a front view of the upper surface (the surface) 2b of the housing 2a, the same applying to the following descriptions). FIG. 5 is a perspective view illustrating an example of the area AL on the left rear side in the housing inside of the upper portion 2C of the housing 2a (or on the left rear side when viewed in a front view of the upper surface (the surface) 2b of the housing 2a, the same applying to the following descriptions). FIG. 6 is a perspective view illustrating a situation where an example of the circuit boards 60 and 10 is further attached to the area AR illustrated in FIG. 4. FIG. 7 is a perspective view illustrating a situation where an example of the circuit board 10 is further attached to the area AL illustrated in FIG. 5.

In the areas AL and AR, fixing portions (protrusions) 51a through 51d are provided on the back surface 2t of the upper wall 2c. The fixing portions 51a through 51d each protrude from the back surface 2t in the thickness direction (the Z-direction) of the first unit 2 (the housing 2a), and each have a female screw hole to which a screw 70 as an example of a fixture is connected (screwed or fixed). That is, the fixing portions 51a through 51d are an example of attachment portions (protrusions, projections, bosses, fixing portions, screwing portions, or connecting portions) P1 through P5.

In this embodiment, several components (modules) can be arranged to overlap with one another in the thickness direction (the Z-direction) in the areas AL and AR in accordance with the settings of the specific properties (such as the arrangement and the heights) of the fixing portions 51a through 51d. The fixing portions 51a having the smallest protrusions are used for installing (fixing or supporting) the circuit boards 10 and 60 and the like. That is, the fixing portions 51a are an example of part of attachment portions P1 for the circuit boards 10 and 60. The fixing portions 51b having higher protrusions than the fixing portions 51a are used for installing (fixing or supporting) the fixing members 30L and 30R (see FIGS. 8 through 11 and others). That is, the fixing portions 51b are an example of part of attachment portions (fixing portions, connecting portions, joining portions, or screwing portions) P2 for the fixing members 30L and 30R. The fixing portions 51c having higher protrusions than the fixing portions 51b are an example of attachment portions (fixing portions, connecting portions, joining portions, or screwing portions) P4 for the fixing members 30L and 30R and the hinge mechanisms 4L and 4R. The fixing portions 51d having higher protrusions than the fixing portions 51c are used for attaching (fixing or connecting) the upper portion 2C and the lower portion 2B of the housing 2a to each other. That is, the fixing portions 51d are an example of attachment portions (fixing portions, connecting portions, joining portions, or screwing portions) P5 for the upper portion 2C and the lower portion 2B.

Protrusions 201a through 201c are also formed on the back surface 2t of the upper wall 2c. The protrusions 201a through 201c each protrude from the back surface 2t in the thickness direction (the Z-direction) of the first unit 2 (or the housing 2a), and are used for positioning (aligning) components (modules), restraining movement of those components, and fixing, guiding, engaging, and supporting those components, for example. That is, the protrusions 201a through 201c are an example of positioning portions (aligning portions, movement restraining portions, fixing portions, guiding portions, or supporting portions) for the components (modules) and the housing 2a. The protrusions 201a through 201c each have a crisscross cross-sectional surface, for example.

The protrusions 201a are used for supporting and fixing the operation buttons 8L and 8R. The operation buttons 8L and 8R (or the movable portions thereof) each comprise an attachment portion 8a having a through hole through which the corresponding protrusion 201a is inserted, and a projection 8b. The attachment portions 8a are supported by or fixed to the protrusions 201a. When an operator operates (pushes or presses, for example) the operation button 8L or 8R (or the movable portion thereof), the projection 8b moves towards inside the housing and presses a switch (not illustrated) provided on one of circuit boards 10 and 60. That is, the projection 8b is an example of a pressing portion (a pressurizing portion or a pushing portion). One of the projections 8b can be used as a supporting portion that is brought into contact with and support the circuit board 10 or 60 or some other component (module), while the other projections 8b can be designed to push the switches at preferred positions.

The protrusions 201b are used for supporting and fixing the circuit boards 10 and 60, for example. The protrusions 201c are used for supporting and fixing the fixing members 30L and 30R (see FIGS. 8 through 11 and others), for example.

Ribs 201d protruding like walls are also formed on the back surface 2t of the upper wall 2c. The ribs 201d are formed adjacent to (along) partitions 2y serving as walls constituting at least part of the concavity 2v, for example. Each of the ribs 201d has a ring-like rectangular shape that is long in the depth direction (the Y-direction), and protrudes from the back surface 2t. The speaker modules 80L and 80R designed to have parallelepiped shapes are housed in areas 201L and 201R surrounded by the ribs 201d, for example. That is, the areas 201L and 201R are an example of housing portions (component housing portions, mounting portions, supporting portions, holders, or component holders) for the speaker modules 80L and 80R. The speaker modules 80L and 80R are an example of a component (a module or the second component).

As is apparent from a comparison between FIGS. 6 and 4 and a comparison between FIGS. 7 and 5, FIGS. 6 and 7 illustrate situations where the circuit boards 10 and 60, the connectors 19, the speaker modules 80L and 80R, and the like are added to the structures illustrated in FIGS. 4 and 5. Wirings 90 are connected to the connectors 19. The wirings 90 are arranged along a predetermined path.

As illustrated in FIG. 6, the circuit board 60 comprises a plate-like base (a board) 60a, and the base 60a has openings 60b in the form of through holes or notches, for example. The protrusions 201b are inserted into at least part of the openings 60b. A screw 70 as a fixture penetrates through an opening (not illustrated) formed on the base 60a, and is screwed (fixed) to a fixing portion 51a (see FIG. 4). That is, the circuit board 60 is fixed to the upper portion 2C of the housing 2a by the screw 70. Therefore, the opening (or the periphery thereof) through which the screw 70 is inserted is an example of an attachment portion (a fixing portion, a connecting portion, a joining portion, or a screwing portion) P1 for attaching the circuit board 60 to the housing 2a.

Figure 8:
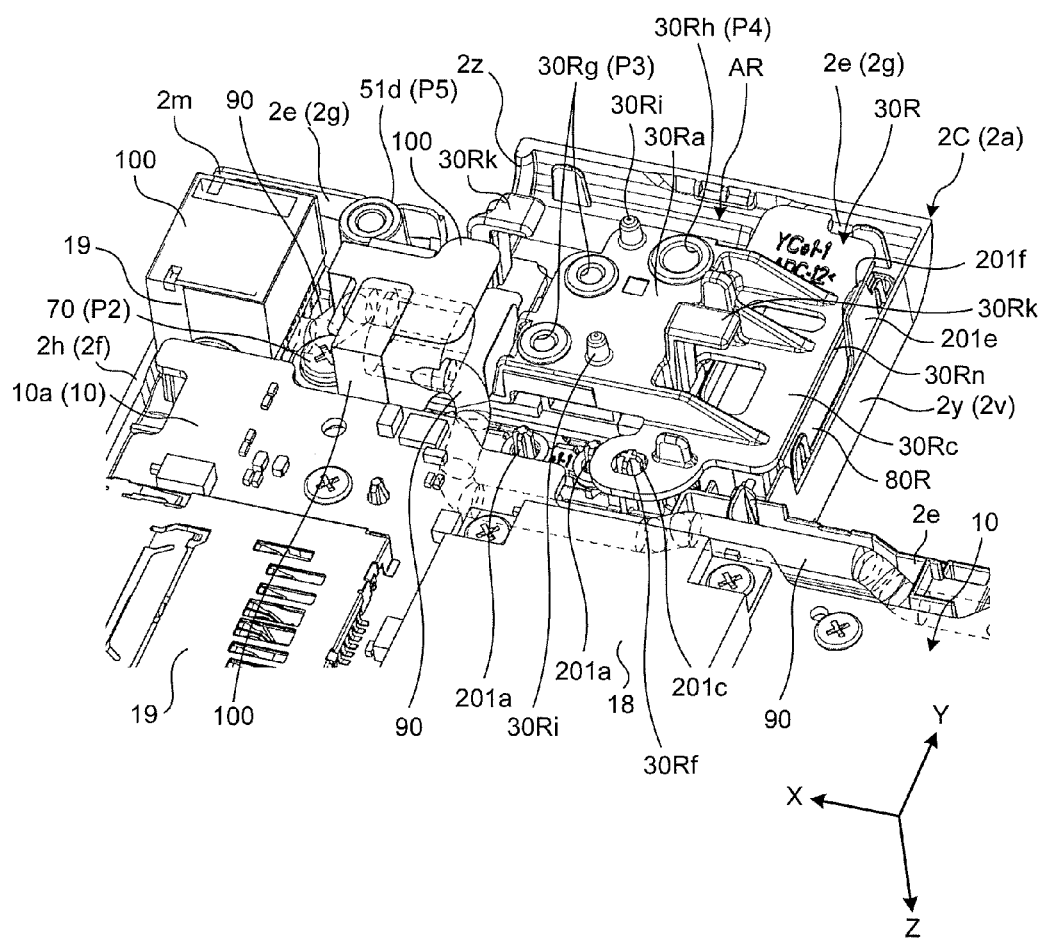
FIG. 8 is an exemplary perspective view illustrating a situation where a fixing member as well as the circuit board is attached to the area on the right rear side in the housing of the upper portion of the first unit of the electronic apparatus in the embodiment.
Figure 9:
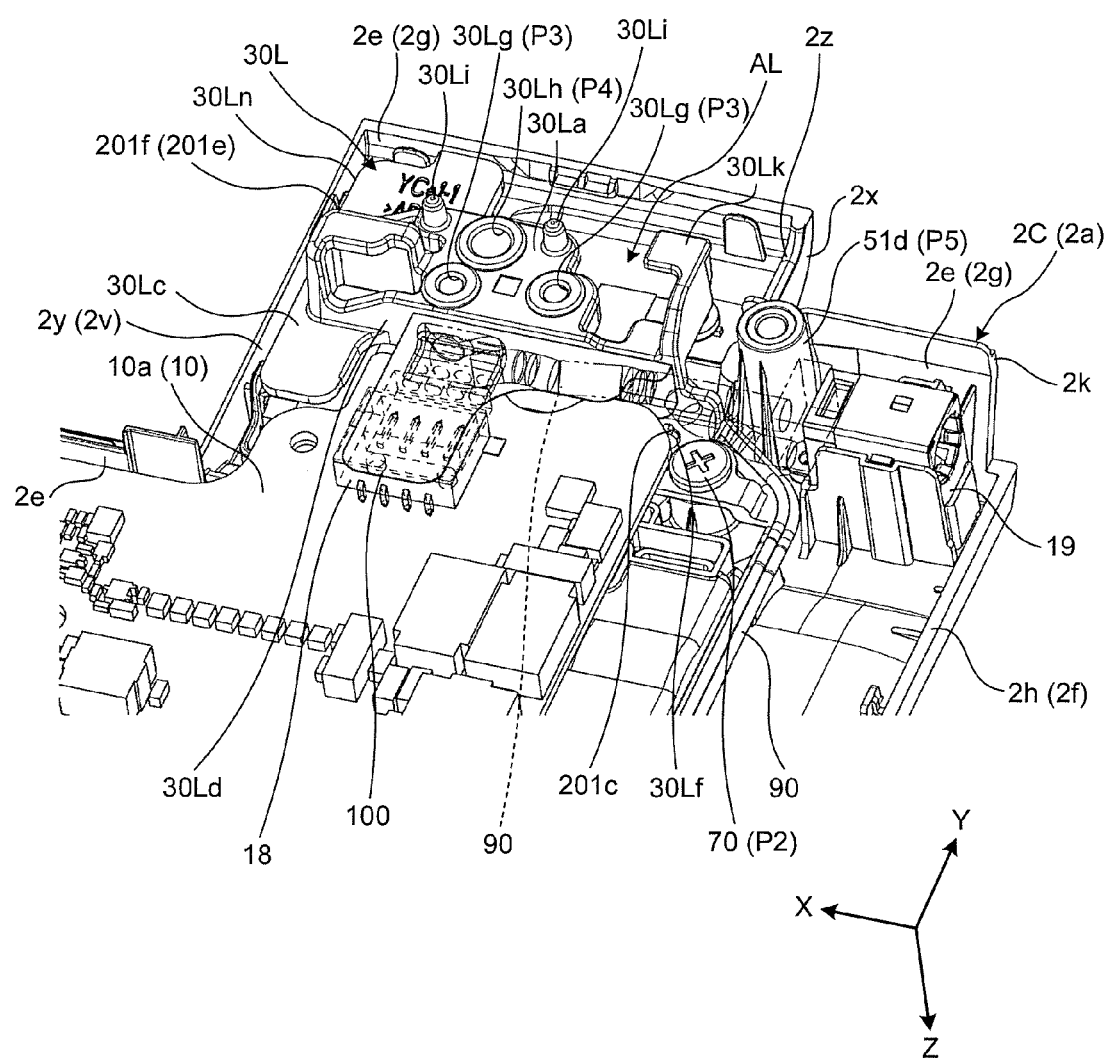
FIG. 9 is an exemplary perspective view illustrating a situation where a fixing member as well as the circuit board is attached to the area on the left rear side in the housing of the upper portion of the first unit of the electronic apparatus in the embodiment.
Figure 10:
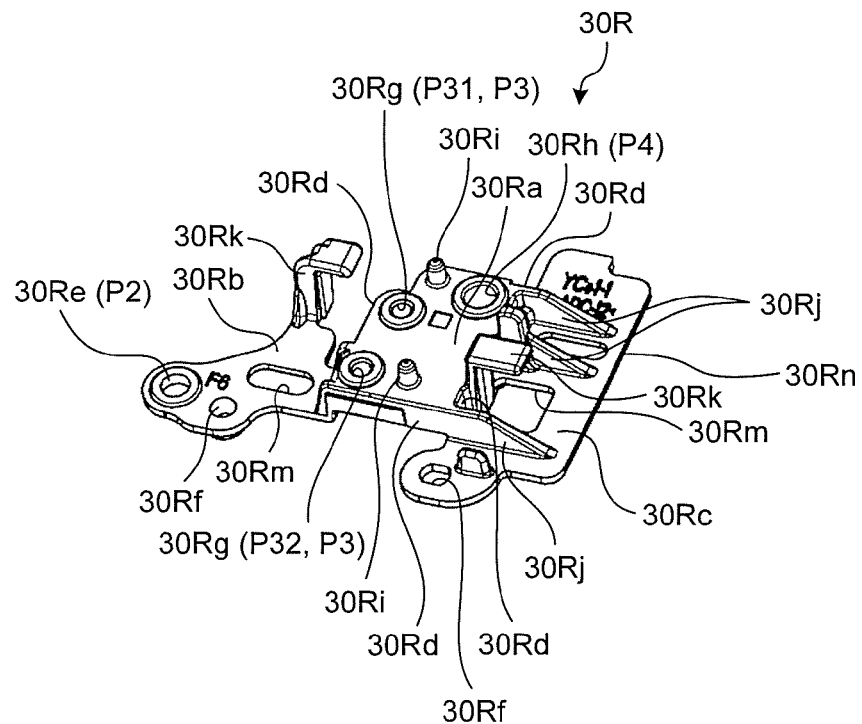
FIG. 10 is an exemplary perspective view illustrating the fixing member to be attached to the area on the right rear side in the housing of the upper portion of the first unit of the electronic apparatus in the embodiment.
Figure 11:
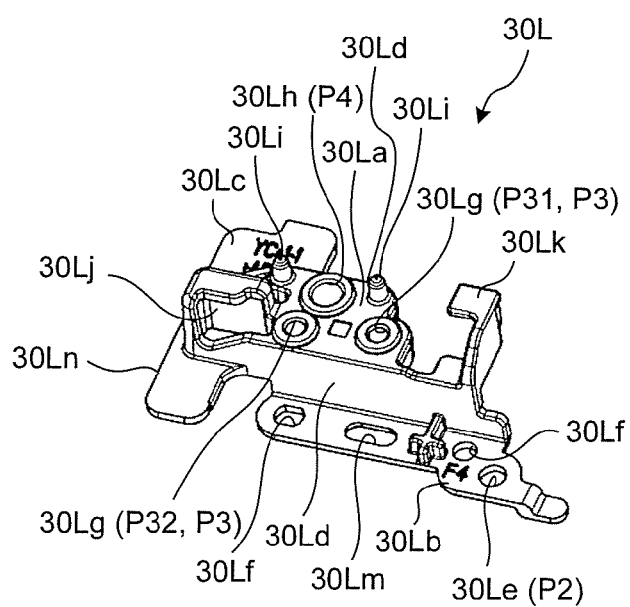
FIG. 11 is an exemplary perspective view illustrating the fixing member to be attached to the area on the left rear side in the housing of the upper portion of the first unit of the electronic apparatus in the embodiment.

FIG. 8 is a perspective view illustrating a situation where an example of the fixing member 30R is further attached to the area AR illustrated in FIG. 6. FIG. 9 is a perspective view illustrating a situation where an example of the fixing member 30L is further attached to the area AL illustrated in FIG. 7. FIG. 10 is a perspective view illustrating an example of the fixing member 30R. FIG. 11 is a perspective view illustrating an example of the fixing member 30L.

As is apparent from a comparison between FIGS. 8 and 6 and a comparison between FIGS. 9 and 7, FIGS. 8 and 9 illustrate situations where the fixing members 30L and 30R are provided to cover the operation buttons 8L and 8R and the circuit board 60, as opposed to the situations illustrated in FIGS. 6 and 7.

As illustrated in FIGS. 10 and 11, the fixing members 30L and 30R comprise bases 30La and 30Ra, attachment portions 30Lb and 30Rb, and supporting portions 30Lc and 30Rc, respectively. The bases 30La and 30Ra, the attachment portions 30Lb and 30Rb, and the supporting portions 30Lc and 30Rc are arranged parallel to one another. Each of the bases (attachment portions or connecting portions) 30La and 30Ra is designed to have a rectangular plate-like shape. Sidewalls (surrounding walls, standing walls, or walls) 30Ld and 30Rd that are vertical and extend in a direction perpendicular to the bases 30La and 30Ra are connected to the peripheries of the bases 30La and 30Ra. By virtue of the sidewalls 30Ld and 30Rd, the portions including the bases 30La and 30Ra and the sidewalls 30Ld and 30Rd are formed into box-like shapes, and the rigidity is made higher.

Openings 30Le and 30Re in the form of through holes or notches are formed in the attachment portions 30Lb and 30Rb. Screws 70 as an example of fixtures penetrate through the openings 30Le and 30Re, and are attached to the fixing portions 51b (P2, see FIGS. 6 and 7) formed in the housing 2a. With this arrangement, the fixing members 30L and 30R are fixed to the upper portion 2C of the housing 2a. Therefore, the openings 30Le and 30Re (or the peripheries thereof) are an example of attachment portions (fixing portions, connecting portions, joining portions, or screwing portions) P2 for attaching the fixing members 30L and 30R to the housing 2a. The attachment portions P2 are an example of housing fixing portions.

The supporting portions 30Lc and 30Rc are designed to have rectangular plate-like shapes, and are located between the upper wall 2c and the lower wall 2d. When the fixing members 30L and 30R are attached to predetermined areas, the speaker modules 80L and 80R are located between the upper wall 2c and the supporting portions 30Lc and 30Rc (see FIGS. 6 through 9). In this embodiment, the supporting portions 30Lc and 30Rc are an example of supporting portions (holders) for the speaker modules 80L and 80R. Also, the upper wall 2c and the supporting portions 30Lc and 30Rc constitute sandwiching portions for sandwiching the speaker modules 80L and 80R. It should be noted that elastic members (flexible members, not illustrated in the drawings) such as sponge or rubber members can be interposed at least either between the supporting portions 30Lc and 30Rc and the speaker modules 80L and 80R, or between the upper wall 2c and the speaker modules 80L and 80R. With such arrangement, the speaker modules 80L and 80R sandwiched between the upper wall 2c and the supporting portions 30Lc and 30Rc can be prevented from receiving a large external force through the upper wall 2c or the supporting portions 30Lc and 30Rc. For example, such elastic members may be wrapped around the external surfaces of the speaker modules 80L and 80R.

Openings 30Lf and 30Rf are also formed in the fixing members 30L and 30R. As illustrated in FIGS. 8 and 9, the protrusions 201c are inserted into the openings 30Lf and 30Rf, so that the fixing members 30L and 30R are positioned (aligned) at predetermined locations with respect to the upper portion 2C of the housing 2a. In a structure in which the openings 30Lf are provided for the fixing member 30L and the openings 30Rf are provided for the fixing member 30R as in this embodiment, one of the openings 30Lf and one of the openings 30Rf may be designed to have round shapes, and the other of the openings 30Lf and the other of the openings 30Rf may be designed to have rectangular shapes.

Openings 30Lg and 30Rg in the form of through holes are also formed on the bases 30La and 30Ra of the fixing members 30L and 30R, for example. The openings 30Lg and 30Rg are used for securing the hinge mechanisms 4L and 4R. For example, the openings 30Lg and 30Rg are formed as female screw holes. Therefore, the openings 30Lg and 30Rg (or the peripheries thereof) are an example of attachment portions (fixing portions, connecting portions, joining portions, or screwing portions) P3 for attaching the hinge mechanisms 4L and 4R to the fixing members 30L and 30R. The attachment portions P3 are an example of a hinge fixing portion (a component fixing portion).

Openings 30Lh and 30Rh in the form of through holes are also formed on the bases 30La and 30Ra of the fixing members 30L and 30R, for example. The openings 30Lh and 30Rh are used for fixing the hinge mechanisms 4L and 4R to the upper portion 2C and the lower portion 2B of the housing 2a. Therefore, the openings 30Lh and 30Rh are an example of attachment portions (fixing portions, connecting portions, joining portions, or screwing portions) P4. The attachment portions P4 are an example of housing fixing portions, and are also an example of common fixing portions.

Protrusions (projections or bumps) 30Li and 30Ri are also formed on the bases 30La and 30Ra of the fixing members 30L and 30R. The protrusions 30Li and 30Ri are used for positioning (aligning or engaging) the hinge mechanisms 4L and 4R.

Ribs 30Lj and 30Rj for strengthening the connecting portions between the bases 30La and 30Ra and the supporting portions 30Lc and 30Rc are also formed in the fixing members 30L and 30R. The ribs 30Lj and 30Rj are formed as walls (ribs, vertical walls, or standing walls) extending in a direction intersecting with (or perpendicular to) the bases 30La and 30Ra and the supporting portions 30Lc and 30Rc, for example.

Hook-like protrusions 30Lk and 30Rk functioning as the movement restraining portions for restraining the wirings 90 as an example of components housed in the housing 2a from moving in predetermined directions (toward predetermined positions or areas) are formed in the fixing members 30L and 30R. Openings 30Lm and 30Rm for reducing weights or adjusting elasticity or rigidity are also formed in the fixing members 30L and 30R as needed.

The supporting portions 30Lc and 30Rc also have end portions (side portions) 30Ln and 30Rn. As illustrated in FIGS. 8 and 9, the end portions 30Ln and 30Rn engage (or are engaged) with engaging portions 201e formed in the upper portion 2C of the housing 2a. The engaging portions 201e are located near the partitions 2y, and protrude from the back surface 2t of the upper wall 2c, as illustrated in FIGS. 4 and 5 and others. Claws 201f are formed at the top ends of the engaging portions 201e. The claws 201f are designed to have hook-like shapes, and protrude toward the inner side of the end portions 30Ln and 30Rn. With the fixing members 30L and 30R being fixed to the housing 2a, the claws 201f hook the end portions 30Ln and 30Rn of the supporting portions 30Lc and 30Rc. The engaging portions 201e are an example of engaged portions (hooking portions or supporting portions). The engaging portions 201e are designed to be elastically deformable, and hook the supporting portions 30Lc and 30Rc. Accordingly, the forces to be applied to the supporting portions 30Lc and 30Rc, or the speaker modules 80L and 80R, can be made smaller than those in a case where the supporting portions 30Lc and 30Rc are fixed by fixtures such as screws. Alternatively, engaging portions may be formed in the fixing members.

As is apparent from FIGS. 6, 8, and 10, the circuit board 60 is placed between a fixing portion 51b and a fixing portion 51c, and the circuit board 60 is arranged between the opening 30Re as an example of an attachment portion P2 serving as a housing fixing portion and the opening 30Rh as an example of an attachment portion P4 serving as a housing fixing portion and a common fixing portion. Accordingly, the degree of flexibility in setting the position for the circuit board 60 can be made higher, for example.

Also, as illustrated in FIGS. 8 and 9, the connectors 19 and the wirings 90 are covered with shielding members (insulators, shields, or protecting members) 100 made of a transparent film or the like in this embodiment. As illustrated in FIG. 9, the fixing member 30L (or the sidewall 30Ld thereof) can be used as a portion (a fixing portion or a supporting portion) for fixing (or supporting) the shielding member 100. Accordingly, the number of components can be made smaller than that in a case where the member for supporting the shielding member 100 is separately provided, for example. The shielding member 100 can be fixed to the sidewall 30Ld by bonding or welding, for example. The shielding member 100 can be bent (or can be flexed, folded, or opened and closed).

Figure 12:
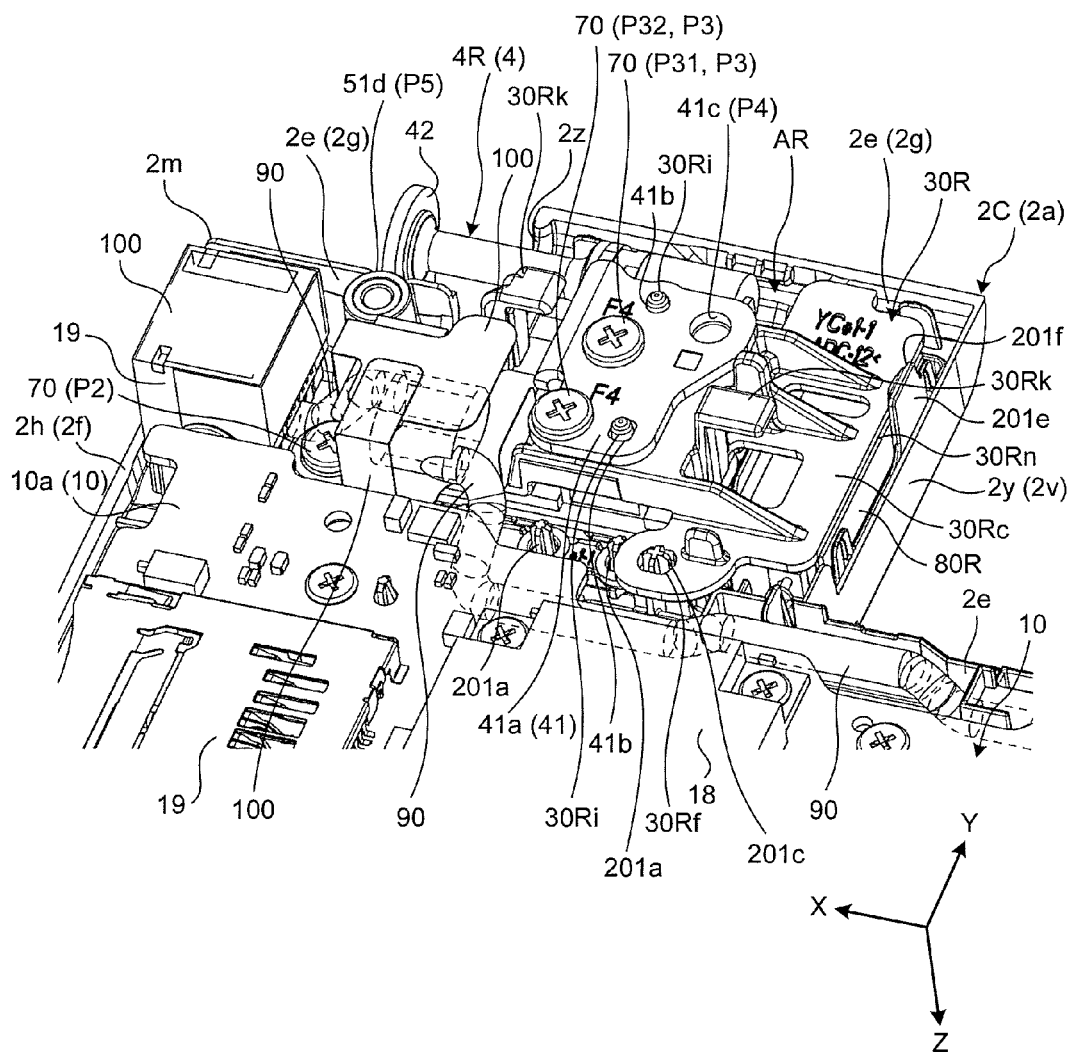
FIG. 12 is an exemplary perspective view illustrating a situation where a hinge mechanism as well as the fixing member and the circuit board are attached to the area on the right rear side in the housing of the upper portion of the first unit of the electronic apparatus in the embodiment.
Figure 13:
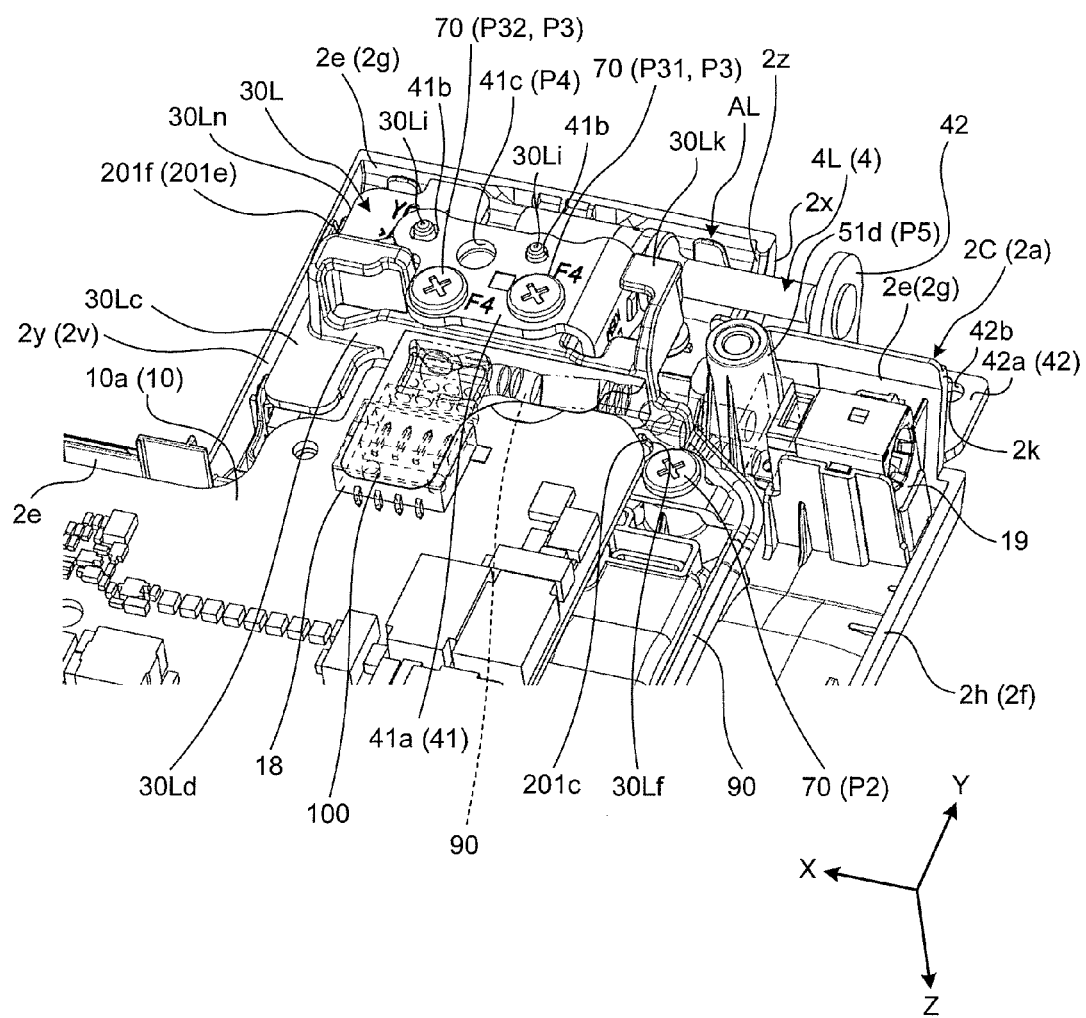
FIG. 13 is an exemplary perspective view illustrating a situation where a hinge mechanism as well as the fixing member and the circuit board are attached to the area on the left rear side in the housing of the upper portion of the first unit of the electronic apparatus in the embodiment.
Figure 14:
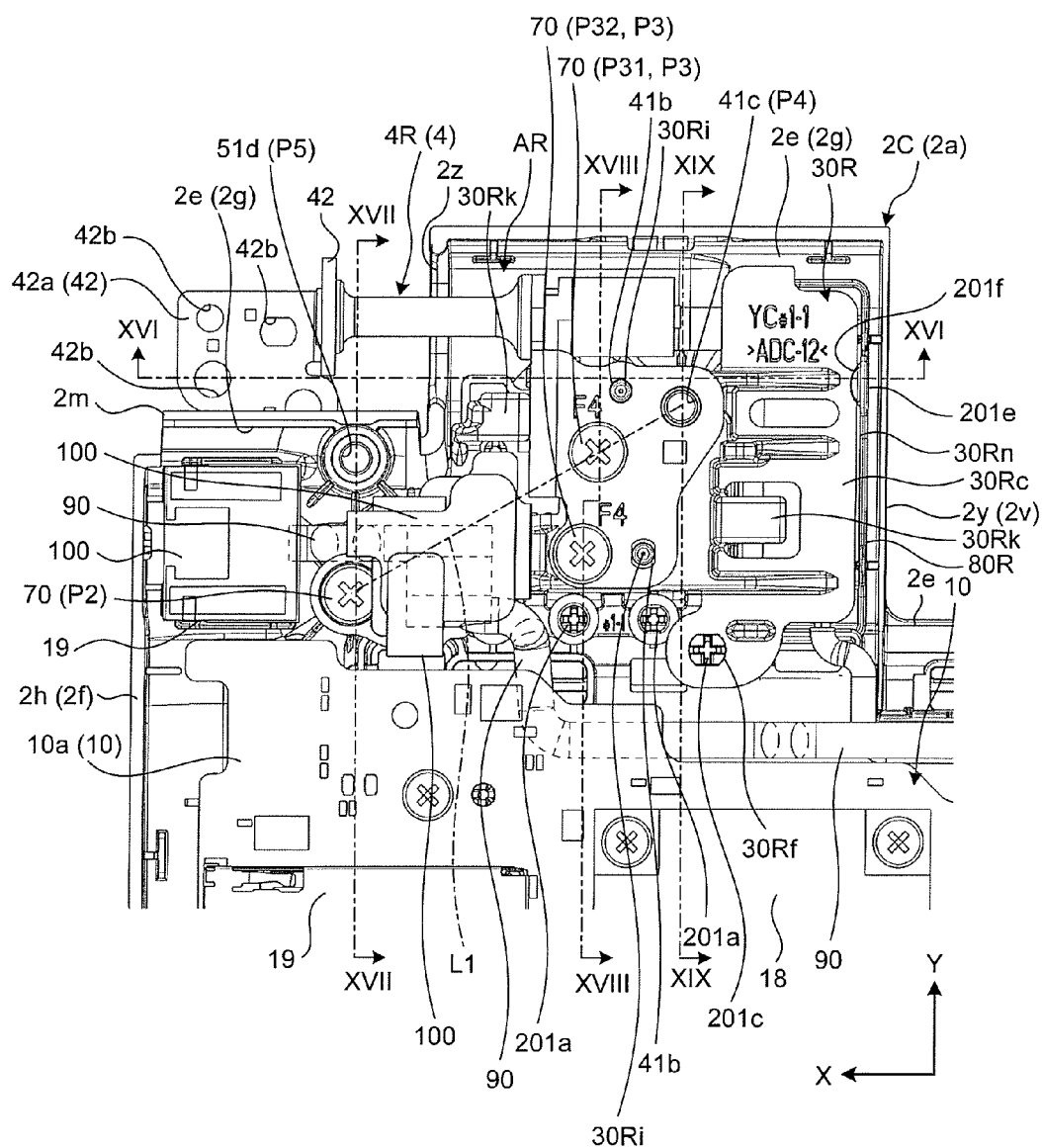
FIG. 14 is an exemplary plan view corresponding to FIG. 12 in the embodiment.
Figure 15:
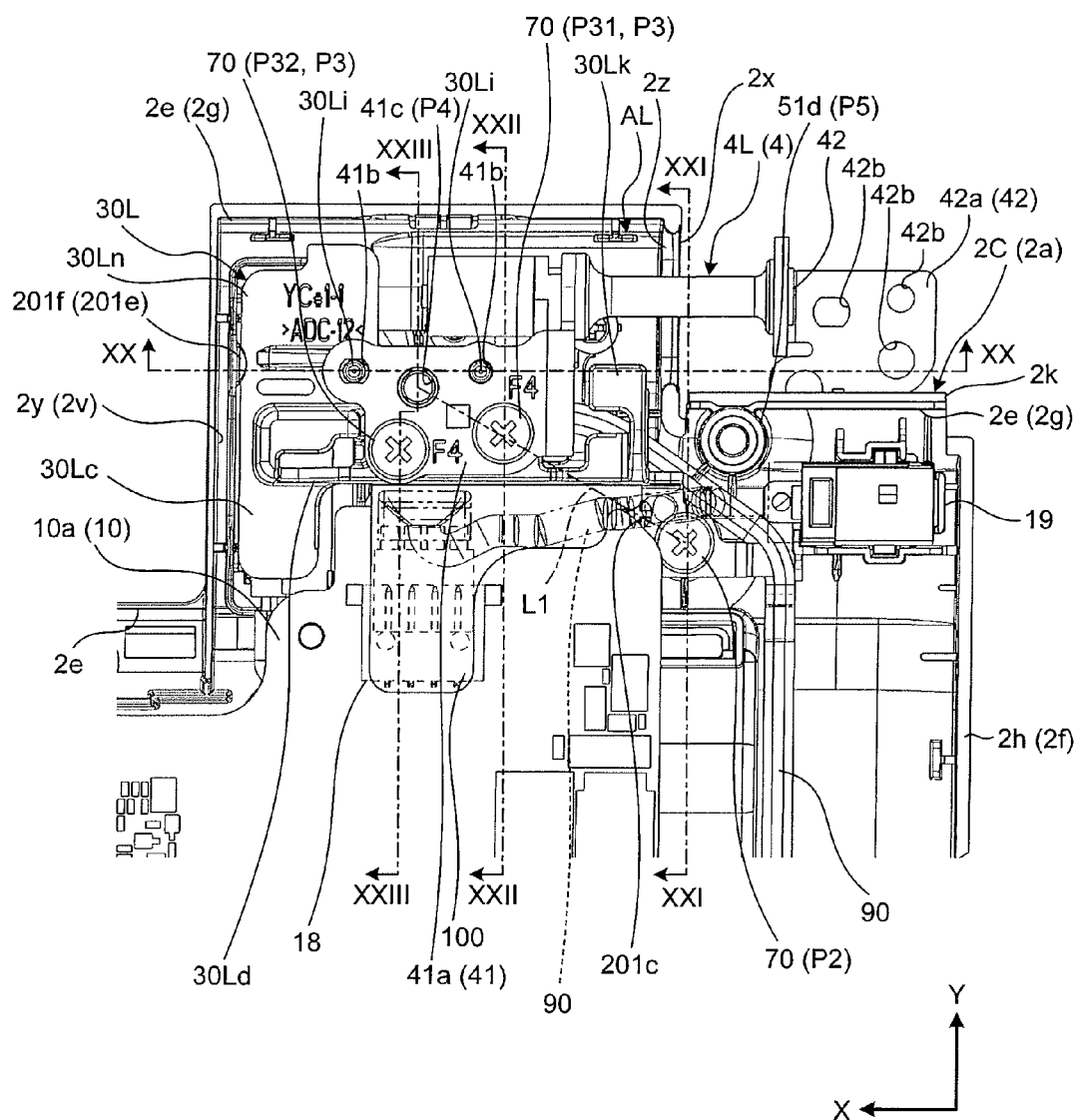
FIG. 15 is an exemplary plan view corresponding to FIG. 13 in the embodiment.

FIG. 12 is a perspective view illustrating a situation where an example of the hinge mechanism 4R is further attached to the area AR illustrated in FIG. 8. FIG. 13 is a perspective view illustrating a situation where an example of the hinge mechanism 4L is further attached to the area AL illustrated in FIG. 9. FIG. 14 is a plan view corresponding to FIG. 12, and FIG. 15 is a plan view corresponding to FIG. 13. As is apparent from a comparison between FIGS. 12 and 8 and a comparison between FIGS. 13 and 9, FIGS. 12 and 13 illustrate situations where the hinge mechanisms 4L and 4R are provided to cover the operation buttons 8L and 8R, the circuit board 60, and the fixing members 30L and 30R, as opposed to the situations illustrated in FIGS. 8 and 9.

The hinge mechanisms 4L and 4R (4) each comprise a first member 41 fixed to the housing 2a of the first unit 2, and a second member 42 rotatably connected to the first member 41 and fixed to the housing 3a of the second unit 3. Each first member 41 comprises a flat plate-like base (an attachment portion or a connecting portion) 41a. Each base 41a has openings 41b into which the protrusions 30Li and 30Ri formed on the bases 30La and 30Ra of the fixing members 30L and 30R are to be inserted. That is, the protrusions 30Li and 30Ri are an example of positioning portions (aligning portions, movement restraining portions, fixing portions, guiding portions, or supporting portions) for positioning the fixing members 30L and 30R and the hinge mechanisms 4L and 4R. The rotating shafts of the hinge mechanisms 4L and 4R extend parallel to the end portion 2g of the housing 2a.

Each base 41a also has openings (not illustrated) formed as through holes or notches through which the screws 70 as fixtures are to penetrate. The screws 70 penetrating through the openings are joined to the openings 30Lg and 30Rg having female screw holes in the fixing members 30L and 30R. That is, the openings 30Lg and 30Rg (or the peripheries thereof) are an example of attachment portions (fixing portions, connecting portions, joining portions, or screwing portions) P3 for attaching the hinge mechanisms 4L and 4R to the fixing members 30L and 30R.

As illustrated in FIGS. 14 and 15, openings 42b are formed on a base 42a of each second member 42. Those openings 42b are used as through portions for fixtures such as screws when the second members 42 (or the hinge mechanisms 4L and 4R) are attached to the housing 3a of the second unit 3.

FIGS. 16 through 19 are cross-sectional views of the first unit 2 (or the housing 2a), taken along the respective lines illustrated in FIG. 14. FIGS. 20 through 23 are cross-sectional views of the first unit 2 (the housing 2a), taken along the respective lines illustrated in FIG. 15.

Figure 16:
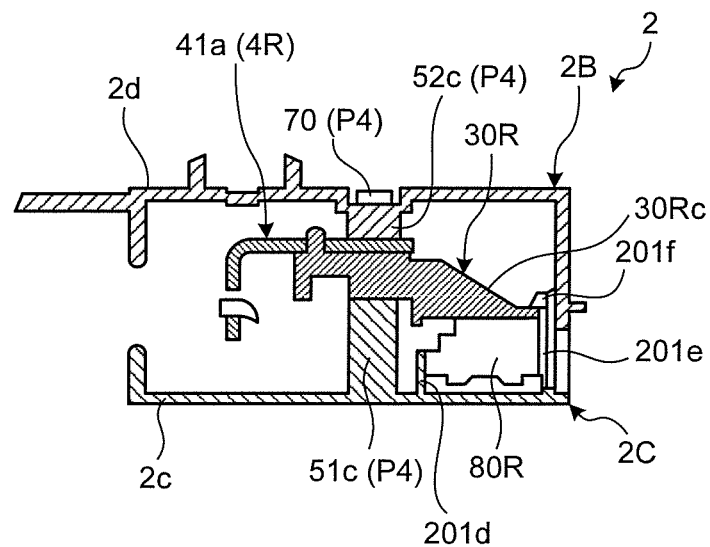
FIG. 16 is an exemplary cross-sectional view of the structure of FIG. 14, taken along the line XVI-XVI.
Figure 20:
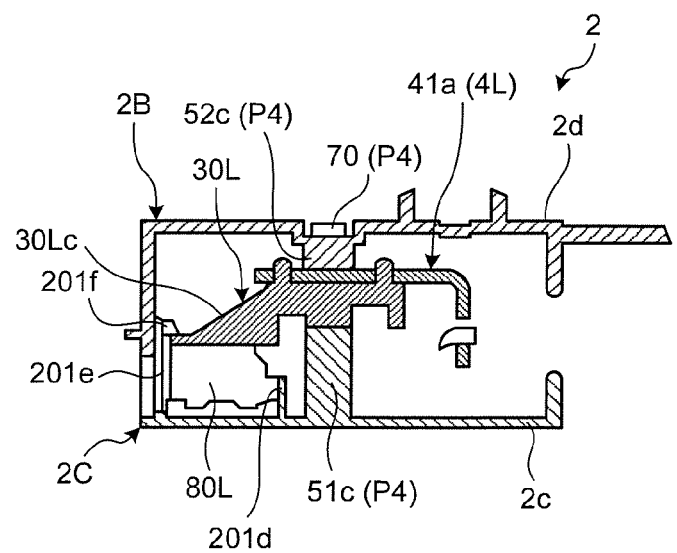
FIG. 20 is an exemplary cross-sectional view of the structure of FIG. 15, taken along the line XX-XX.

As illustrated in FIGS. 16 and 20, in the housing 2a, the speaker modules 80L and 80R are located between the upper wall 2c of the upper portion 2C and the supporting portions 30Lc and 30Rc of the fixing members 30L and 30R attached to the housing 2a. That is, the fixing members 30L and 30R support the speaker modules 80L and 80R at locations close to the upper wall 2c. In this embodiment, the speaker modules 80L and 80R are supported by the ribs 201d of the upper portion 2C and the fixing members 30L and 30R. That is, the speaker modules 80L and 80R housed in the areas 201L and 201R (see FIGS. 4 and 5) serving as housing portions are supported by the supporting portions 30Lc and 30Rc of the fixing members 30L and 30R. If the speaker modules 80L and 80R are attached to the first members 41 of the hinge mechanisms 4L and 4R or the fixing members 30L and 30R, the components (such as screws or flanges) for the attachment are needed, and therefore, the entire structure tends to become larger. According to this embodiment, on the other hand, the speaker modules 80L and 80R housed (held) in the areas 201L and 201R are supported by the supporting portions 30Lc and 30Rc of the fixing members 30L and 30R. Accordingly, the supporting mechanisms for the speaker modules 80L and 80R can be made smaller, for example. Also, as a fixing process using screws or the like can be eliminated, the effort required in the assembling can be made smaller.

Figure 17:
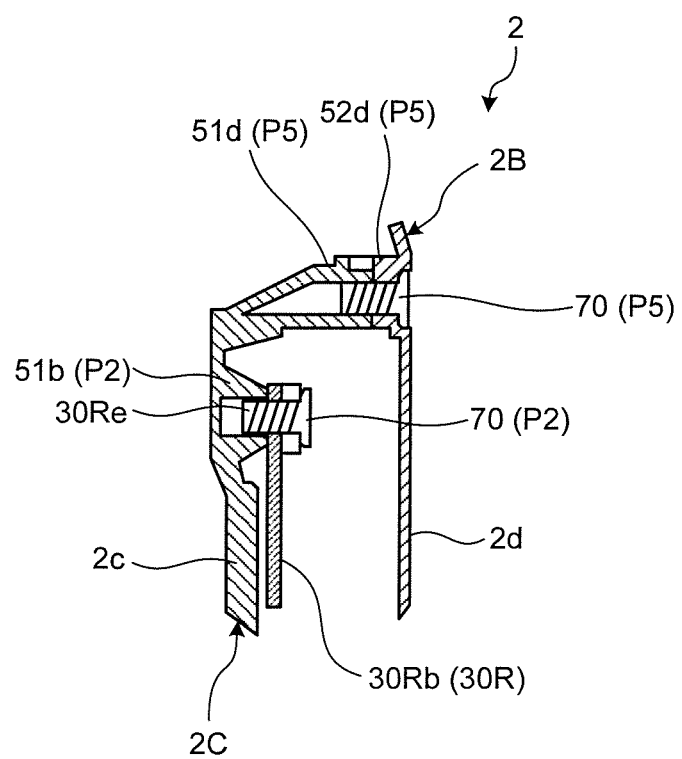
FIG. 17 is an exemplary cross-sectional view of the structure of FIG. 14, taken along the line XVII-XVII.
Figure 18:
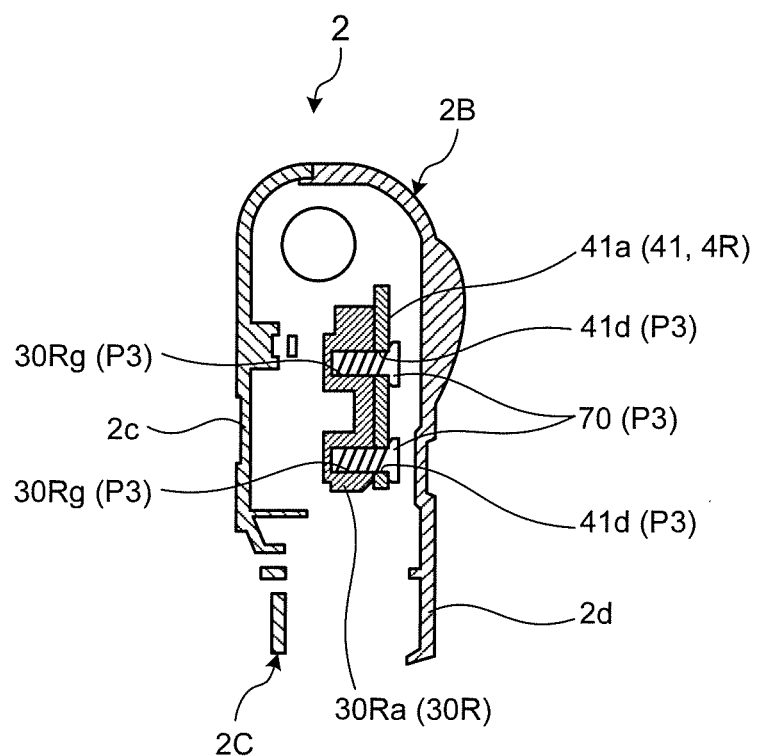
FIG. 18 is an exemplary cross-sectional view of the structure of FIG. 14, taken along the line XVIII-XVIII.
Figure 19:
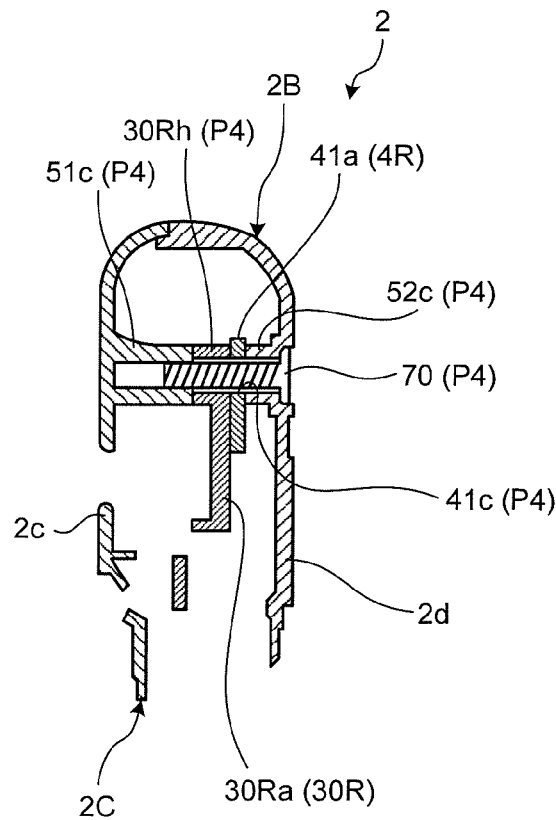
FIG. 19 is an exemplary cross-sectional view of the structure of FIG. 14, taken along the line XIX-XIX.
Figure 21:
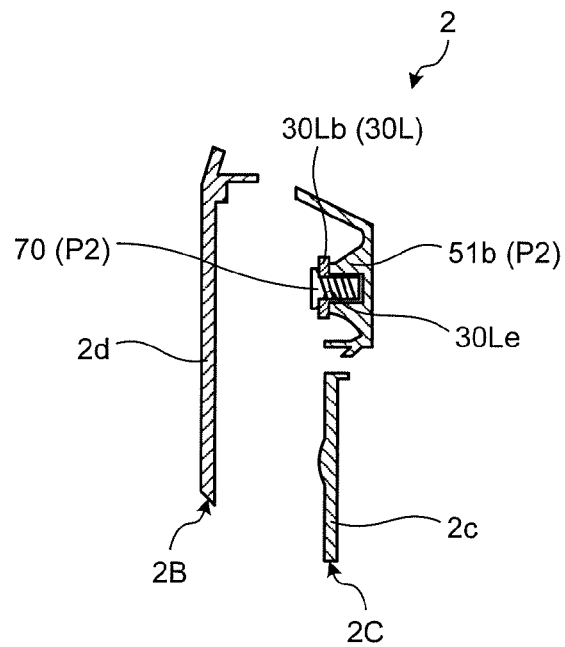
FIG. 21 is an exemplary cross-sectional view of the structure of FIG. 15, taken along the line XXI-XXI.
Figure 22:
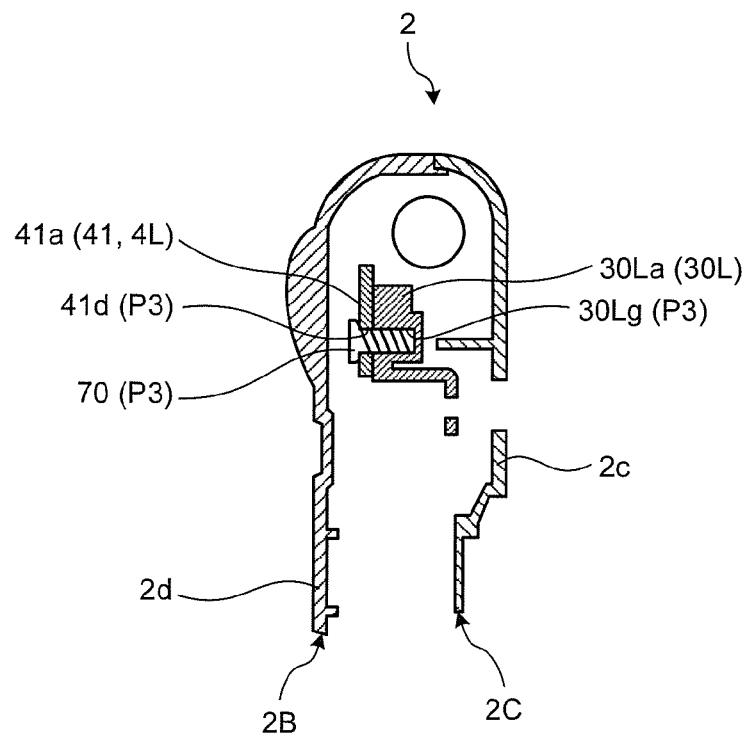
FIG. 22 is an exemplary cross-sectional view of the structure of FIG. 15, taken along the line XXII-XXII.
Figure 23:
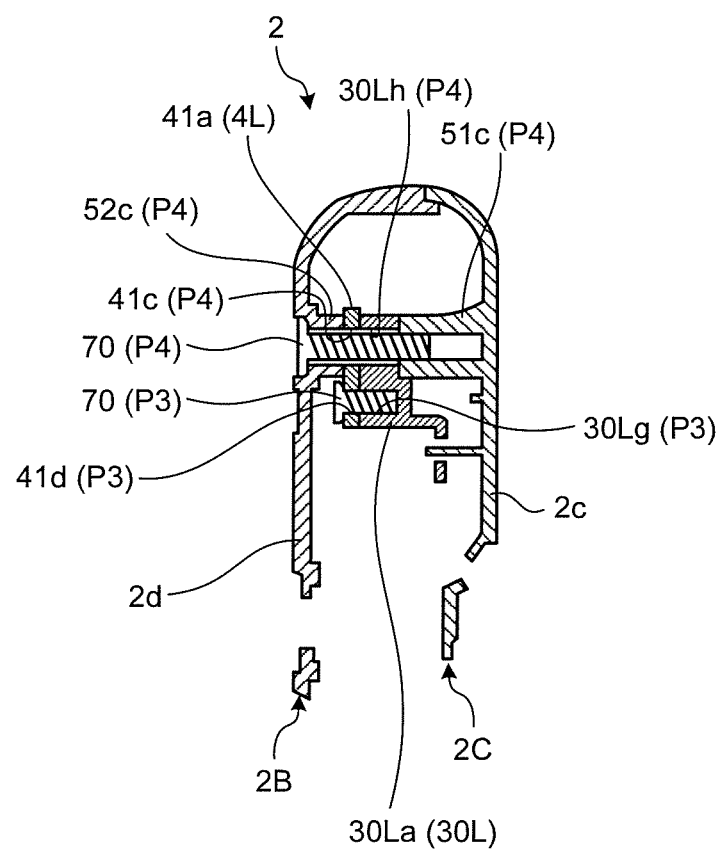
FIG. 23 is an exemplary cross-sectional view of the structure of FIG. 15, taken along the line XXIII-XXIII.

As illustrated in FIGS. 17 and 21, in this embodiment, the fixing members 30L and 30R are fixed to the upper portion 2C at the attachment portions P2 by the screws 70. Also, as illustrated in FIGS. 18 and 22, the first members 41 of the hinge mechanisms 4L and 4R are fixed to the fixing members 30L and 30R at the attachment portions P3 by the screws 70. As illustrated in FIGS. 19 and 23, the fixing members 30L and 30R and the first members 41 are fixed to the housing 2a at the attachment portions P4 by the screws 70, while being sandwiched between the fixing portions 51c of the upper portion 2C and the fixing portions 52c of the lower portion 2B.

As illustrated in FIGS. 14 and 15, the attachment portions P3 (two attachment portions P31 and P32 in this embodiment) that are an example of joining portions between the first members 41 and the fixing members 30L and 30R are located near the attachment portions P4 that are an example of joining portions for the first members 41, the fixing members 30L and 30R, and the housing 2a. Also, as illustrated in FIGS. 10 and 11, the rigidities of the bases 30La and 30Ra having the attachment portions P3 and P4 formed thereon are increased by the sidewalls 30Ld and 30Rd. As illustrated in FIGS. 14 and 15, at least one (P31) of the attachment portions P3 that are an example of the joining portions for each first member 41 and the fixing members 30L and 30R is located between an attachment portion P4 and an attachment portion P2 as an example of a joining portion for the fixing members 30L and 30R and the housing 2a. With this arrangement, the first members 41 can be more firmly or stably joined (fixed or attached) to the housing 2a via the fixing members 30L and 30R. Furthermore, the moment arm at each attachment portion P31 having a line segment L1 connecting the center of the corresponding attachment portion P2 and the center of the corresponding attachment portion P4 can be made smaller. Accordingly, the screws 70 do not easily become loose, for example. The other one (P32) of the attachment portions P3 is deviated from a line extending along the attachment portions P2, P31, and P4. Accordingly, misalignment between the first members 41 (the hinge mechanisms 4L and 4R) and the bases 30La and 30Ra (the fixing members 30L and 30R) can be easily restrained, and the first members 41 can be joined more firmly to the fixing members 30L and 30R. The attachment portions P31 (the corresponding openings 30Lg and 30Rg) are an example of a first hinge fixing portion. The attachment portions P32 (the corresponding openings 30Lg and 30Rg) are an example of a second hinge fixing portion.

In this embodiment, the hinge mechanisms 4L and 4R are attached (joined) to the upper portion 2C via the fixing members 30L and 30R. Also, the circuit board 10 and components (housed components or modules) in the housing 2a are also attached (joined) to the upper portion 2C. The lower portion 2B is then attached (joined) to the upper portion 2C to which the hinge mechanisms 4L and 4R, the circuit board 10, the components, and the like are attached. In a case where the circuit board 10 and the components in the housing 2a are attached to the lower portion 2B while the hinge mechanisms 4L and 4R attached to the second unit 3 (or having the second unit 3 attached thereto) are attached to the upper portion 2C, heavy components are attached to each other in the later attaching process (the assembling process) for the lower portion 2B and the upper portion 2C. Therefore, it is difficult for a worker to conduct the attaching process. That is, in this embodiment, the lighter-weight lower portion 2B is attached to the upper portion 2C to which the hinge mechanisms 4L and 4R attached to the second unit 3, the circuit board 10, and the components in the housing 2a are attached. Accordingly, it is easier to conduct the attaching process (the assembling process), for example.

In this embodiment, through holes are formed in fixing portions 52d formed in the lower portion 2B at the attachment portions P5 of the upper portion 2C and the lower portion 2B illustrated in FIG. 17, and in the fixing portions 52c formed in the lower portion 2B at the attachment portions P4 illustrated in FIGS. 19 and 23, for example. Screws 70 serving as fixtures penetrate through the through holes.

Figure 24:
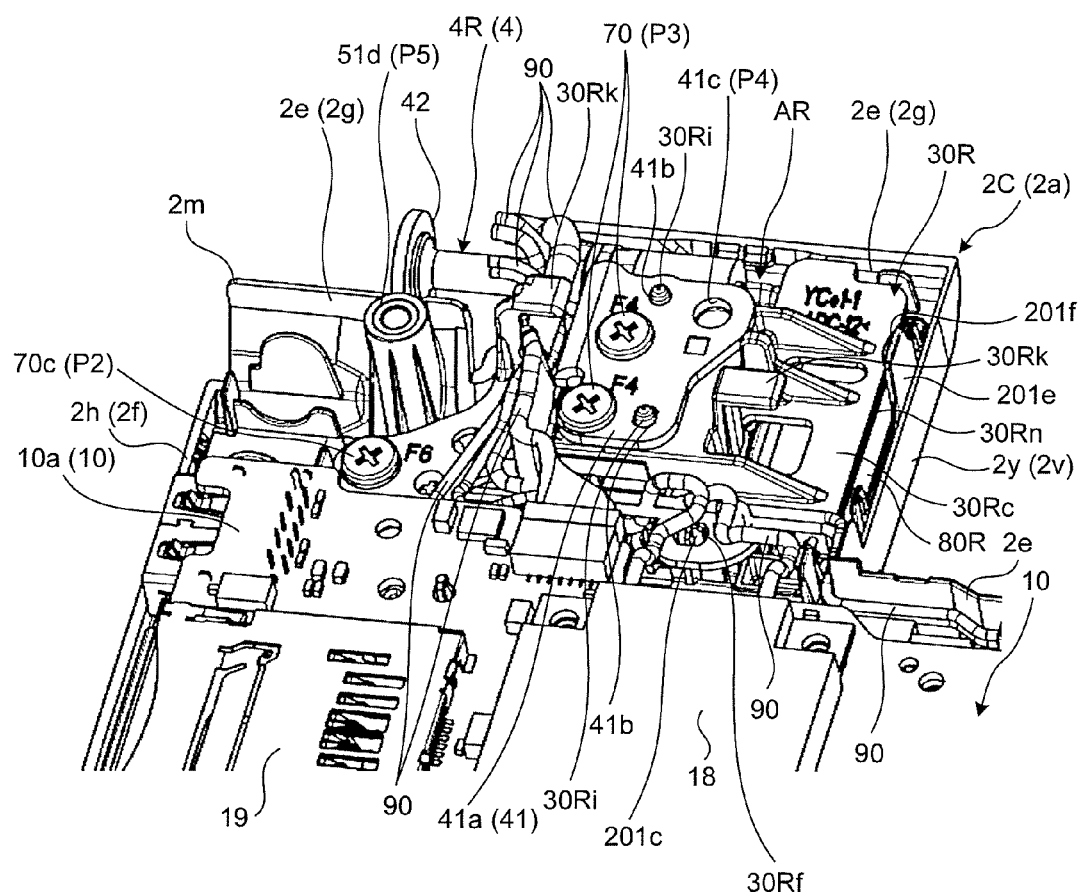
FIG. 24 is an exemplary perspective view illustrating a situation where the hinge mechanism as well as the fixing member and the circuit board are attached to, and wirings are arranged in the area on the right rear side in the housing of the upper portion of the first unit of the electronic apparatus in the embodiment.
Figure 25:
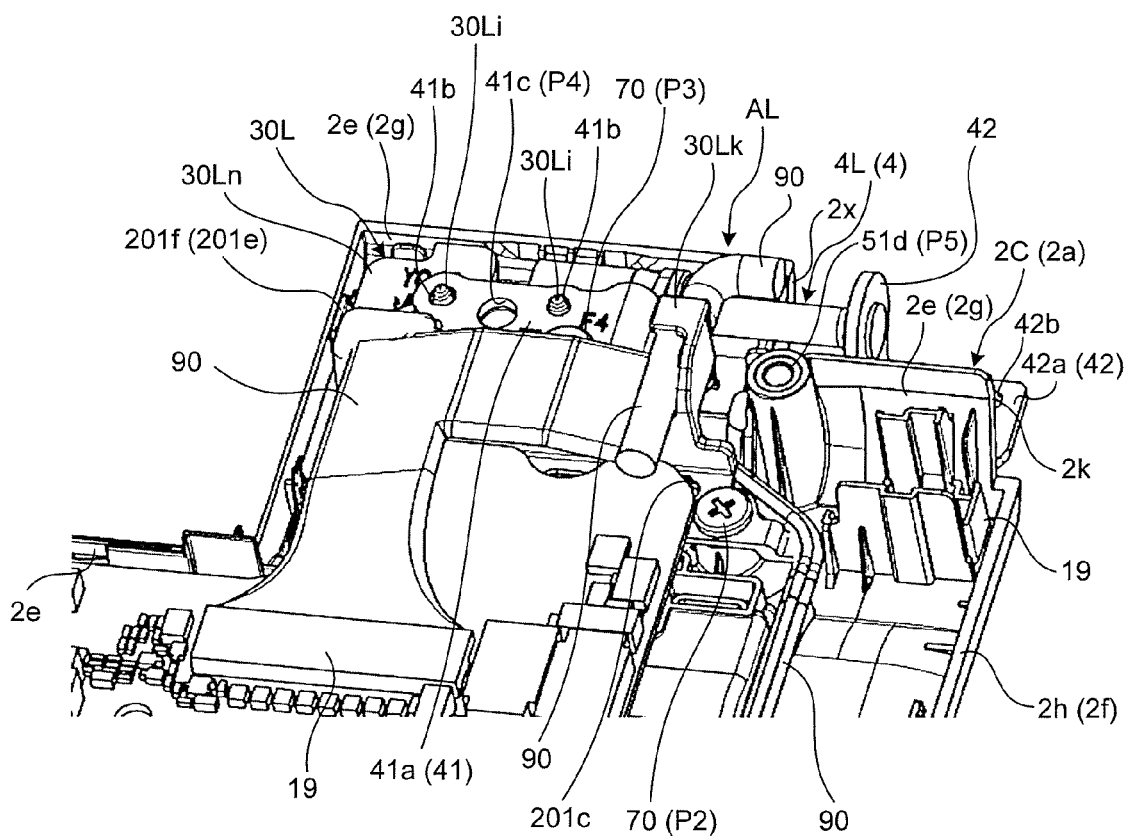
FIG. 25 is an exemplary perspective view illustrating a situation where the hinge mechanism as well as the fixing member and the circuit board are attached to, and wirings are arranged in the area on the left rear side in the housing of the upper portion of the first unit of the electronic apparatus in the embodiment.

FIG. 24 is a perspective view illustrating a situation where an example of the wirings 90 is further attached to the area AR illustrated in FIG. 12. FIG. 25 is a perspective view illustrating a situation where an example of the wirings 90 is further attached to the area AL illustrated in FIG. 13. As illustrated in FIGS. 24 and 25, in this embodiment, the protrusions 30Lk and 30Rk formed in the fixing members 30L and 30R restrain the wirings 90 from moving toward openings 2z (see FIGS. 4 and 5 and others) through which the hinge mechanisms 4L and 4R are passed. The openings 2z are formed in partitions 2x that constitute at least part of the areas AL and AR. The claws 201f protrude from the top ends of the engaging portions 201e in such a direction as to move away from the openings 2z. The wirings 90 are an example of a second component. The protrusions 30Lk and 30Rk are an example of a movement restraining portion.

As described above, in this embodiment, the speaker modules 80L and 80R as an example of a component are housed in the areas 201L and 201R as an example of a component housing portion, and the supporting portions 30Lc and 30Rc of the fixing members 30L and 30R as an example of a first component support the speaker modules 80L and 80R as an example of a second component at locations close to the upper wall 2c as an example of a first wall. Accordingly, the speaker modules 80L and 80R can be more easily provided in the housing 2a with smaller mechanisms, for example.

Also, in this embodiment, the engaging portions 201e that cause the fixing members 30L and 30R to engage with the housing 2a are formed in at least either the fixing members 30L and 30R or the housing 2a as an example of a first housing (the engaging portions 201e are formed, for example, in the housing 2a in this embodiment), and the supporting portions 30Lc and 30Rc are located between the engaging portions 201e and the attachment portions P2 and P4 as an example of housing fixing portions. Accordingly, by setting the specific properties of the engaging portions 201e, the forces to be applied from the supporting portions 30Lc and 30Rc to the speaker modules 80L and 80R can be made smaller than those in a case where fixtures such as screws are used for the fixing, for example.

Also, in this embodiment, the fixing members 30L and 30R comprise protrusions 30Lk and 30Rk as an example of the movement restraining portion that restrains the wirings 90 from moving toward the openings 2z through which the hinge mechanisms 4L and 4R (4) are passed. Accordingly, the number of components can be made smaller than that in a case where the movement restraining portion is separately provided, for example.

Although an exemplary embodiment has been described so far, the present invention is not limited to the above described embodiment, and various changes may be made to that. The present embodiment can be applied to components (housed components or modules) other then speaker modules and wirings.

Also, appropriate changes may be made to the specific properties (such as the structures, shapes, sizes, lengths, widths, thicknesses, heights, numbers, layouts, locations, and materials) in embodying the electronic apparatuses, the first unit, the second unit, the housing, the first wall, the second wall, the hinge, the component, the second component, the component housing portion, the housing fixing portions, the hinge fixing portion, the first hinge fixing portion, the second hinge fixing portion, the common fixing portion, the supporting portion, the fixing member, the engaging portion, the opening, the movement restraining portion, the circuit board, the second circuit board, and the like.

The above embodiment can provide a novel electronic apparatus that causes fewer problems when components that are at least partially housed in a housing are attached to the housing.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a first housing comprising a first wall and a second wall located on an opposite side of the first wall;
a second housing;
a hinge configured to connect the first housing to the second housing so that the first housing and the second housing can be pivoted relative to each other;
a component housed in a component housing portion formed at the first wall; and
a fixing member comprising a housing fixing portion fixed to the first housing, a hinge fixing portion to which the hinge is fixed, and a supporting portion configured to support the component at a location close to the first wall, the supporting portion being located between the first wall and the second wall, wherein
the first housing contains a second component, and has an opening through which the hinge is passed, and
the fixing member comprises a movement restraining portion configured to restrain the second component from moving toward the opening, the movement restraining portion being located on a side of the opening of the second component.

2. The electronic apparatus of claim 1, wherein
an engaging portion with which the fixing member and the first housing are engaged is provided in at least one of the fixing member and the first housing, and
the supporting portion is located between the housing fixing portion and the engaging portion.

3. The electronic apparatus of claim 1, wherein
the fixing member comprises a plurality of the housing fixing portions, and
the hinge fixing portion is located between the housing fixing portions.

4. The electronic apparatus of claim 3, wherein
the fixing member comprises a common fixing portion configured to fix the hinge and the fixing member to the first housing, and
the hinge fixing portion is located between the common fixing portion and the housing fixing portion different from the common fixing portion.

5. The electronic apparatus of claim 3, wherein
the hinge fixing portion comprises:
a first hinge fixing portion is placed in a line with the housing fixing portions, and
a second hinge fixing portion deviating from the line in which the first hinge fixing portion is placed with the housing fixing portions.

6. The electronic apparatus of claim 3, further comprising a circuit board fixed to the first wall,
wherein a part of the fixing member between the housing fixing portions is arranged over the circuit board.

7. The electronic apparatus of claim 1, wherein the first housing comprises:
a first portion comprising the first wall, a second circuit board being attached to the first portion; and
a second portion comprising the second wall, the second portion being attached to the first portion to which the second circuit board, the fixing member, and the hinge are attached.

* * * * *